US009635123B2

(12) United States Patent
Kondo et al.

(10) Patent No.: US 9,635,123 B2
(45) Date of Patent: Apr. 25, 2017

(54) COMPUTER SYSTEM, AND ARRANGEMENT OF DATA CONTROL METHOD

(71) Applicant: HITACHI, LTD., Tokyo (JP)

(72) Inventors: Nobukazu Kondo, Tokyo (JP); Ken Sugimoto, Tokyo (JP); Yuusuke Fukumura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 112 days.

(21) Appl. No.: 14/525,321

(22) Filed: Oct. 28, 2014

(65) Prior Publication Data

US 2015/0120859 A1  Apr. 30, 2015

(30) Foreign Application Priority Data

Oct. 29, 2013 (JP) ................................. 2013-224047

(51) Int. Cl.
*H04L 29/08* (2006.01)
*G06F 15/167* (2006.01)
(Continued)

(52) U.S. Cl.
CPC ...... *H04L 67/2842* (2013.01); *G06F 12/0868* (2013.01); *G06F 12/0897* (2013.01);
(Continued)

(58) Field of Classification Search
None
See application file for complete search history.

(56) References Cited

U.S. PATENT DOCUMENTS 8,074,028 B2 * 12/2011 Plamondon ......... G06F 12/0813
711/122
8,166,242 B2 * 4/2012 Oe ...................... G06F 12/0866
709/226

(Continued)

FOREIGN PATENT DOCUMENTS

EP           1345113 A2    9/2003
JP        2000-293317 A   10/2000

OTHER PUBLICATIONS

Extended European Search Report received in corresponding European Application No. 14190870.7 dated Mar. 27, 2015.

*Primary Examiner* — Greg C Bengzon
(74) *Attorney, Agent, or Firm* — Mattingly & Malur, PC

(57) ABSTRACT

A computer system include a service server, a storage server and a management server, wherein the service server includes a operating system, wherein the operating system includes a cache driver, wherein the storage server manages a plurality of tiered storage areas each having an access performance different from one another, wherein the management server includes an alert setting information generation part for generating alert setting information for the service servers to transmit alert information notifying a trigger to change an arrangement of data in accordance with a state of the service, and a control information generation part for generating cache control information including a first command for controlling an arrangement of cache data on a storage cache and tier control information including a second command for controlling an arrangement of the data on the plurality of tiered storage areas.

12 Claims, 26 Drawing Sheets

(51) Int. Cl.
*G06F 12/0868* (2016.01)
*G06F 12/0897* (2016.01)
*G06F 12/0804* (2016.01)

(52) U.S. Cl.
CPC ........ *G06F 15/167* (2013.01); *G06F 12/0804* (2013.01); *G06F 2212/1041* (2013.01); *G06F 2212/217* (2013.01); *G06F 2212/222* (2013.01); *G06F 2212/262* (2013.01); *G06F 2212/263* (2013.01); *G06F 2212/311* (2013.01); *G06F 2212/313* (2013.01)

(56) References Cited

U.S. PATENT DOCUMENTS

| | | | |
|---|---|---|---|
| 8,315,995 B1 | 11/2012 | Levy | |
| 8,386,717 B1* | 2/2013 | Banerjee | G06F 12/123 711/118 |
| 8,489,820 B1* | 7/2013 | Ellard | G06F 12/0246 711/120 |
| 8,566,553 B1* | 10/2013 | Marshak | G06F 3/0619 711/170 |
| 9,026,765 B1* | 5/2015 | Marshak | G06F 3/061 711/114 |
| 9,043,530 B1* | 5/2015 | Sundaram | G06F 3/068 711/100 |
| 9,218,294 B1* | 12/2015 | Patil | G06F 12/0246 |
| 2002/0099908 A1 | 7/2002 | Yamamoto et al. | |
| 2003/0177330 A1 | 9/2003 | Idei et al. | |
| 2007/0245090 A1* | 10/2007 | King | G06F 12/0813 711/129 |
| 2008/0162817 A1 | 7/2008 | Batterywala | |
| 2009/0024793 A1 | 1/2009 | Fontenot et al. | |
| 2010/0100683 A1* | 4/2010 | Guthrie | G06F 12/0862 711/122 |
| 2010/0153646 A1* | 6/2010 | Chen | G06F 12/0897 711/122 |
| 2010/0199036 A1* | 8/2010 | Siewert | G06F 3/0613 711/112 |
| 2011/0047437 A1* | 2/2011 | Flynn | G06F 9/52 714/758 |
| 2011/0082967 A1* | 4/2011 | Deshkar | G06F 12/0246 711/103 |
| 2011/0145367 A1* | 6/2011 | Ananthanarayanan | H04L 67/2842 709/219 |
| 2011/0145479 A1* | 6/2011 | Talagala | G06F 12/02 711/103 |
| 2012/0137075 A1* | 5/2012 | Vorbach | G06F 9/526 711/122 |
| 2012/0191773 A1* | 7/2012 | Appleton | H04L 67/2842 709/203 |
| 2012/0198174 A1* | 8/2012 | Nellans | G06F 12/0804 711/133 |
| 2012/0317366 A1* | 12/2012 | Sato | G06F 12/0866 711/141 |
| 2013/0036266 A1* | 2/2013 | Naganuma | G06F 3/061 711/114 |
| 2013/0054897 A1* | 2/2013 | Flemming | G06F 12/0888 711/122 |
| 2013/0086324 A1* | 4/2013 | Soundararajan | G06F 12/0813 711/122 |
| 2013/0097680 A1* | 4/2013 | Bendapudi | H04L 67/2842 726/6 |
| 2013/0166724 A1* | 6/2013 | Bairavasundaram | G06F 9/5016 709/224 |
| 2013/0166839 A1* | 6/2013 | Burton | G06F 3/0611 711/114 |
| 2013/0227051 A1* | 8/2013 | Khakpour | H04L 67/2842 709/213 |
| 2013/0282982 A1 | 10/2013 | Hayashi | |
| 2013/0290529 A1* | 10/2013 | Gordon | H04L 67/1097 709/224 |
| 2014/0040550 A1* | 2/2014 | Nale | G06F 13/1694 711/118 |
| 2014/0082310 A1* | 3/2014 | Nakajima | G06F 12/0862 711/162 |
| 2014/0130055 A1* | 5/2014 | Guha | G06F 3/0604 718/104 |
| 2014/0164621 A1* | 6/2014 | Nakama | H04L 47/70 709/226 |
| 2014/0223072 A1* | 8/2014 | Shivashankaraiah | G06F 12/0871 711/103 |
| 2014/0258609 A1* | 9/2014 | Cui | G06F 3/061 711/113 |
| 2014/0297919 A1* | 10/2014 | Nachimuthu | G11C 14/009 711/102 |
| 2015/0039837 A1* | 2/2015 | Quan | G06F 3/061 711/136 |
| 2015/0347311 A1* | 12/2015 | Tanaka | G06F 3/061 711/118 |
| 2016/0203085 A1* | 7/2016 | Kranich | G06F 12/0802 713/2 |

* cited by examiner

SERVICE MANAGEMENT INFORMATION 131

| SERVICE ID 601 | SERVICE SERVER ID 602 | APPLICATION ID 603 | FILE ID 604 | SCHEDULE 605 | RELATED SERVICE ID 606 | PRIORITY 607 | STATUS 608 |
|---|---|---|---|---|---|---|---|
| J1 | S1 | AP1 | F1, F2 | 16:00:00—18:59:59 | J2 | 0 | CURRENTLY EXECUTED |
| J2 | S1 | AP2 | F2, F3 | 19:00:00—23:59:59 | J3 | - | EXECUTION IN WAITING |
| J3 | S1 | AP3 | F4 | 0:00:00—05:59:59 | - | - | EXECUTION IN WAITING |
| J4 | S2 | AP11 | F11, F12 | 12:00:00—14:59:59 | J5 | 1 | EXECUTION IN WAITING |
| ... | ... | ... | ... | ... | ... | ... | ... |

*Fig. 6*

SERVER CACHE MANAGEMENT INFORMATION

| SERVICE SERVER ID (701) | CACHE CAPACITY (702) | USAGE (703) | CACHE HIT RATIO (704) | UPPER LIMIT (705) | LOWER LIMIT (706) |
|---|---|---|---|---|---|
| S1 | 1TB | 200GB | 29% | 80% | 15% |
| S2 | 500GB | 390GB | 67% | 85% | 20% |
| ⋮ | ⋮ | ⋮ | ⋮ | ⋮ | ⋮ |

STORAGE CACHE MANAGEMENT INFORMATION

| CACHE CAPACITY (801) | USAGE (802) |
|---|---|
| 1TB | 200GB |

FILE MANAGEMENT INFORMATION

| FILE ID (901) | LDEV ID (902) | DATA CAPACITY (903) |
|---|---|---|
| F1 | LDEV1 | 1GB |
| F2 | LDEV2 | 2GB |
| F3 | LDEV1 | 1.5GB |
| ⋮ | ⋮ | ⋮ |

STORAGE CONFIGURATION MANAGEMENT INFORMATION

| LU ID | SERVICE SERVER ID | LDEV ID | RAID GROUP ID | SERVER PORT ID | STORAGE PORT ID |
|---|---|---|---|---|---|
| LU1 | S1 | LDEV1 | R1 | P1 | P100 |
| LU2 | S1 | LDEV2 | R1 | P2 | P101 |
| LU3 | - | - | R1 | - | - |
| ⋮ | ⋮ | ⋮ | ⋮ | ⋮ | ⋮ |
| LU12 | S2 | LDEV1 | R2 | P1 | P102 |
| ⋮ | ⋮ | ⋮ | ⋮ | ⋮ | ⋮ |

*Fig. 10*

TIER MANAGEMENT INFORMATION

| TIER ID | BELONGING LU ID |
|---|---|
| T1 | LU1 |
|  | LU2 |
|  | ⋮ |
| T2 | LU11 |
|  | LU12 |
|  | ⋮ |

*Fig. 11*

CONTROL POLICY INFORMATION 137

| POLICY ID 1201 | CONTROL CONDITION 1202 | | CONTROL CONTENT 1203 |
|---|---|---|---|
| 1 | CACHE HIT RATIO | SERVICE SERVER | 1. NOTIFICATION SETTING OF SERVER CACHE INFORMATION : NOTIFICATION TIMER =1 sec |
| | | STORAGE SERVER | 1. UPPER LIMIT =85%, LOWER LIMIT 20%<br>2. FILE CACHE CONTROL<br>① CACHE HIT RATIO > UPPER LIMIT : WRITING STORAGE CACHE FILE BACK IN LU<br>② CACHE HIT RATIO < LOWER LIMIT : STORING FILE IN STORAGE CACHE<br>3. FILE TIER CONTROL<br>① CACHE HIT RATIO > UPPER LIMIT : STORING FILE IN LOWER TIER<br>② CACHE HIT RATIO < LOWER LIMIT : STORING FILE IN HIGHER TIER |
| 2 | BATCH JOB | SERVICE SERVER | 1. SETTING SERVICE START NOTIFICATION : ( SERVICE ID , FILE ID , TIMER )<br>2. SETTING SERVICE END NOTIFICATION : ( SERVICE ID , FILE ID , ADDRESS ) |
| | | STORAGE SERVER | 1. FILE CACHE CONTROL<br>① STORING FILE USED BY SERVICE IN HIGHER TIER<br>2. FILE TIER CONTROL<br>① STORING FILE USED BY SERVICE IN HIGHER TIER<br>② STORING FILE USED BY SERVICE IN LOWER TIER |
| ... | ... | | ... |

*Fig. 12*

CONTROL MANAGEMENT INFORMATION

CACHE CONTROL INFORMATION

| SERVICE ID | FILE ID | TYPE | COMMAND |
|---|---|---|---|
| J1 | F1 | ADD | discard ID address/ ~length |
| J1 | F2 | ADD | |
| J4 | F11 | DELETE | |
| ⋮ | ⋮ | ⋮ | ⋮ |

TIER CONTROL INFORMATION

| SERVICE ID | FILE ID | TYPE | COMMAND |
|---|---|---|---|
| J1 | F1 | UP | move source ID address / |
| J2 | F2 | UP | |
| J4 | F11 | DOWN | |
| ⋮ | ⋮ | ⋮ | ⋮ |

*Fig. 13*

ALERT SETTING INFORMATION

| NOTIFICATION TIMER | 1 sec |
|---|---|

CONTROL MANAGEMENT INFORMATION

CACHE CONTROL INFORMATION

1300

| SERVICE ID (1301) | FILE ID (1302) | TYPE (1303) | COMMAND (1304) |
|---|---|---|---|
| J1 | F1 | ADD | discard ID address/~length |
| J1 | F2 | ADD | |
| J4 | F11 | DELETE | |
| ⋮ | ⋮ | ⋮ | ⋮ |

TIER CONTROL INFORMATION

1310

| SERVICE ID (1311) | ALERT (2101) | FILE ID (1312) | TYPE (1313) | COMMAND (1314) |
|---|---|---|---|---|
| J1 | TIMER | F2 | UP | |
| J1 | F2 (0x0010000) | F1 | DOWN | |
| J1 | F2 (0x0010000) | F3 | UP | |
| ⋮ | ⋮ | ⋮ | ⋮ | ⋮ |
| J2 | F3 (0x1100000) | F2 | DOWN | |
| J2 | F2 (0x1100000) | F3 | DOWN | |
| J2 | F2 (0x1100000) | F4 | UP | |
| ⋮ | ⋮ | ⋮ | ⋮ | ⋮ |

*Fig. 21*

COMPUTER SYSTEM, AND ARRANGEMENT OF DATA CONTROL METHOD

CLAIM OF PRIORITY

The present application claims priority from Japanese patent application JP 2013-224047 filed on Oct. 29, 2013, the content of which is hereby incorporated by reference into this application.

BACKGROUND OF THE INVENTION

The present invention relates generally to controlling data arrangement in a storage server which provides storage area used by a service server.

In recent years, non-volatile memories (NVM) such as Flash memory are used in various types of electronic equipment. Unlike a hard disk drive (HDD), the nonvolatile memory does not involve a mechanical operation, and permits faster access than the HDD.

Nonvolatile memories are also used in enterprise applications such as a server and a storage system that need fast data access. Particularly, nonvolatile memories mountable in servers become inexpensive, and are thus becoming popular.

A well-known conventional technique includes a system in which Flash memory is used as data cache memory but not as a main memory (see, for example, the description of US 2009/0024793 A1). In such system, the cache driver included in an OS, or the like, running on a server stores some cache data in the Flash memory and discharges other cache data from the Flash memory based on the access characteristics of data (e.g., access frequency). By doing so high speed data access is achieved.

Also, another well-known conventional technique includes a storage system in which a storage medium having a higher access capability and a storage medium having a lower access capability configure a tiered storage area whereby, based on the access characteristic of data, the storage area for the data is changed (see, for example, the description of JP Laid-open Patent Publication No. 2000-293317).

SUMMARY OF THE INVENTION

According to the conventional techniques, the cache driver on the server executes the control process on the cache storage apparatus such as Flash memory or the like, while a management computer executes the control process regarding the data arrangement of the storage system. In other words, the conventional techniques provide no system allowing the cache driver and the management computer to control the data arrangement in a cooperative manner since the cache driver and the management computer according to the conventional techniques are designed to operate independently.

When the cache driver and the management computer control data arrangement in a manner independent from one another, unproductive phenomenon such as even though the cache data necessary for a service is stored in the cache storage apparatus on a server, the data will be stored in the storage area on a higher tier of the storage system, could occur. In other words, the data arrangement according conventional techniques does not allow the processing capability of the applications of the computer system to be optimized.

The present invention is an invention in view of the problems described above. That is, the present invention is intended to provide a computer system in which the cache driver of a server and a management computer control the data arrangement in a cooperative manner.

The present invention can be appreciated by the description which follows in conjunction with the following figures, wherein: a computer system comprising a plurality of servers and a management server. The plurality of servers includes a plurality of service servers having an application executing a predetermined service, and a storage server storing therein data used by the application. Each of the plurality of service servers includes a first processor, a first memory coupled to the first processor, a first cache device in which a server cache for temporarily storing data is set up, coupled to the first processor, and a first interface for coupling to another apparatus coupled to the first processor. The storage server includes a second processor, a second memory coupled to the second processor, a second cache device in which a storage cache for temporarily storing data is set up, coupled to second processor, a second interface for coupling to another apparatus coupled to the second processor, and a plurality of storage apparatuses each having an access performance different from one another. The management server includes a third process, a third memory coupled to the third processor, and a third interface for coupling to another apparatus coupled to the third processor. The each of the plurality of service servers includes a first operating system for controlling a service server. The first operating system includes a cache driver for controlling the server cache. The storage server includes a second operating system for controlling the storage server The second operating system generates, via the plurality of storage apparatuses, a plurality of tiered storage areas each having an access performance different from one another, and manages the plurality of tiered storage areas distinctively per performance thereof. The management server includes a cache optimization part for transmitting a control instruction for arrangement of data on the storage server based on information transmitted from the cache driver. The cache optimization part includes: an alert setting information generation part for generating alert setting information for the each of the plurality of service servers to transmit alert information notifying a trigger to change an arrangement of data in accordance with a state of the service, and for transmitting the generated alert setting information to the each of the plurality of service servers; and a control information generation part for generating at least one of cache control information including a first command for controlling an arrangement of cache data on the storage cache and tier control information including a second command for controlling an arrangement of the data on the plurality of tiered storage areas, and for transmitting control information including at least one of the cache control information and the tier control information to the storage server. The cache driver of the each of the plurality of service servers transmits the alert information to the management server in case of detecting the trigger to change the arrangement of the data based on the alert setting information. The second operating system executes at least one of a cache control process for controlling the arrangement of the data on the storage cache and a tier control process for controlling the arrangement of the data on the plurality of tiered storage areas based on the control information received from the management server.

According to the present invention, a cache driver of a service server transmits alert information in accordance with the status of a service to a management server, which, upon receiving the alert information, transmits at least either cache control information or tier control information to a storage server in order to control the arrangement of data on the storage server. By virtue of such scheme it becomes possible to allow the cache driver of the service server and the management server to control the data arrangement in a cooperative manner.

The problems, structures and effects other than those described above are made clear by the following explanation of the embodiment.

BRIEF DESCRIPTION OF THE DRAWINGS

The present invention can be appreciated by the description which follows in conjunction with the following figures, wherein:

FIG. 6 is an explanatory diagram illustrating an example of service management information according to the first embodiment;

FIG. 7 is an explanatory diagram illustrating an example of server cache management information according to the first embodiment;

FIG. 8 is an explanatory diagram illustrating an example of storage cache management information according to the first embodiment;

FIG. 9 is an explanatory diagram illustrating an example of file management information according to the first embodiment;

FIG. 10 is an explanatory diagram illustrating an example of storage configuration management information according to the first embodiment;

FIG. 11 is an explanatory diagram illustrating an example of tier management information according to the first embodiment;

FIG. 12 is an explanatory diagram illustrating an example of control policy information according to the first embodiment;

FIG. 13 is an explanatory diagram illustrating an example of control management information according to the first embodiment;

FIG. 14 is an explanatory diagram illustrating an example of alert setting information according to the first embodiment.

FIG. 21 is an explanatory diagram illustrating an example of the control management information according to a second embodiment;

DETAILED DESCRIPTION OF THE EMBODIMENTS

Hereinafter, preferred embodiments of the present invention will be described with reference to the accompanying drawings.

Figure 1:
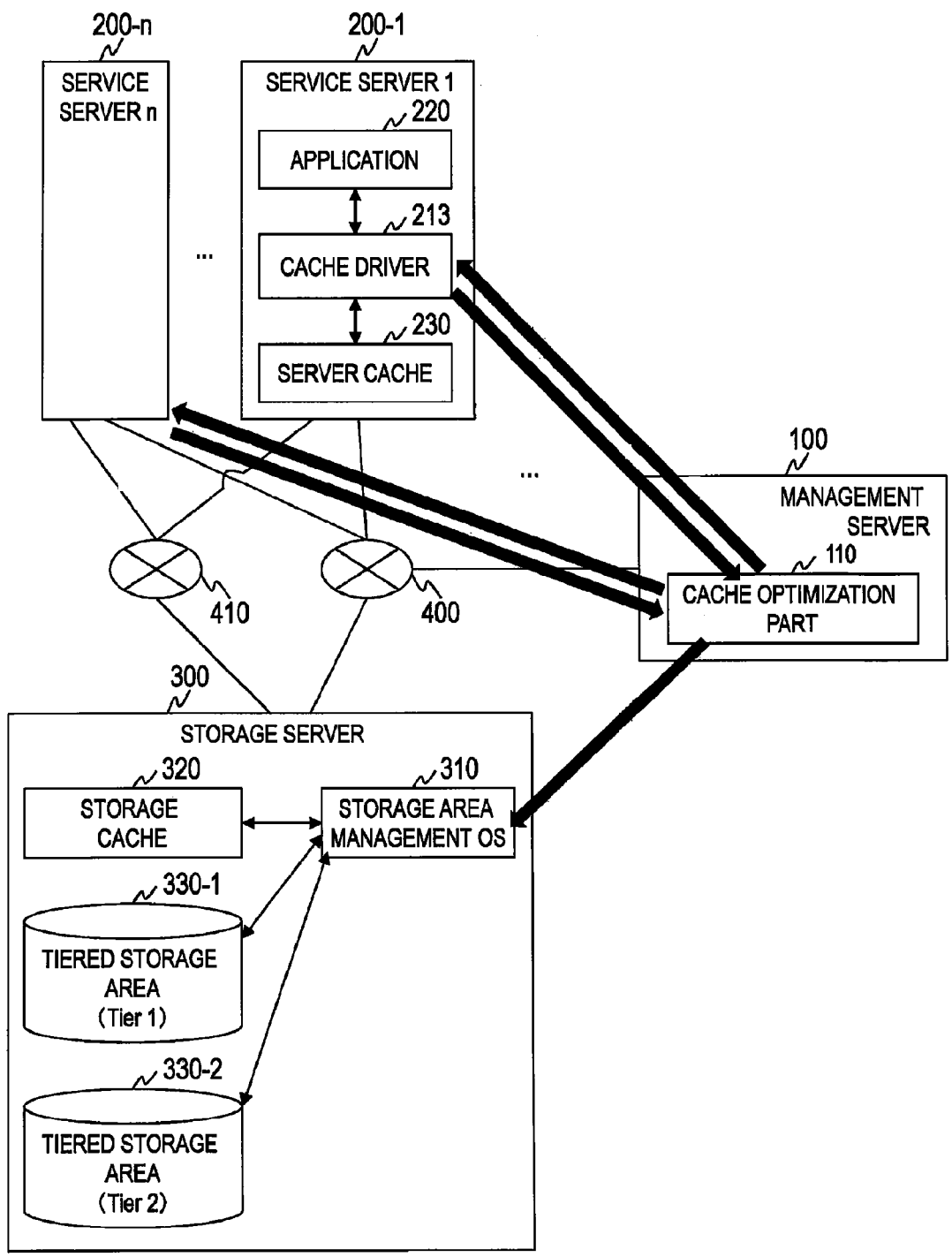
FIG. 1 is a block diagram illustrating a summary of a present invention.

FIG. 1 is a block diagram illustrating a summary.

A computer system according to the present invention includes a management server 100, a plurality of service servers 200, and a storage server 300. Note that the present invention may include more than one storage servers 300.

The management server 100 is connected with the plurality of service servers 200 and the storage server 300 via a management network 400. Further, each service server 200 is connected with the storage server 300 via a service network 410. Note that the each service server 200 may be connected with the storage server 300 via a service network other than the service network 410.

The service server 200 is a computer configured to execute arbitrary operations, and at least one application 220 runs on the service server 200. Further, the service server 200 includes a cache driver 213 and a server cache 230. The server cache 230 is a storage area configured to temporarily store data. The cache driver 213 is a module configured to control the server cache 230 in accordance with access request issued from the application 220.

The storage server 300 is a computer configured to provide a storage area for the application 220 running on the service server 200. A storage area management OS 310 which manages storage areas runs on the storage server 300. Further, the storage server 300 includes a storage cache 320 and a plurality of tiered storage areas 330. The storage cache 320 is a storage area configured to temporarily store data. The tiered storage area 330 is a storage area provided for the service server 200.

Note that the storage server 300 according to an example illustrated in FIG. 1 includes a tiered storage area 330-1 and a tiered storage area 330-2 each having access performance different from one another. The storage server 300 provides a storage area of at least one of the tiered storage areas 330-1 and 330-2 to each service server 200.

Accordingly, data used by the application 220 will be stored in the tiered storage area of either the tiered storage area 330-1 or the tiered storage area 330-2. Further, data accessed by the application 220 will be temporarily stored in the storage cache 320. Note that in the description herein the data used by the application 220 will also be referred to as service data.

Note that the storage cache 320 and the plurality of tiered storage areas 330 according to the present invention include a multi-tiered structure. According to the example illustrated in FIG. 1, the storage cache 320 is the storage area arranged at the highest tier followed by, in a descending order, the tiered storage area 330-1 (Tier 1) and the tiered storage area 330-2 (Tier 2). In other words, the higher the performance of the storage area is, the higher in the tiers it will be arranged, and thus the higher the management priority will be assigned thereto. Also note that the storage server 300 may include more than three tiered storage areas 330.

Note that the management server 100 controls the storage location of the service data in the storage server 300 in a cooperative manner with the cache driver 213 on each service server 200. In other words, the storage location storing therein the service data is the subject of control. More specifically, the following control procedures will be executed.

First, the management server 100 performs an initial configuration in accordance with a control policy in order to notify the status of the server cache 230 and/or the execution status of services, or the like, to each service server 200. Each service server 200 notifies the status of the server cache 230 and/or the execution status of services, or the like, to the management server 100 in accordance with said configuration.

The management server 100 determines a storage location of the service data of each application 220 in the storage server 300 in accordance with the information notified by each service server 200. Further, the management server 100 provides an instruction to change the storage location of the service data to the storage server 300.

The storage server 300 changes the storage area of the service data in accordance with the instruction from the management server 100. For example, with respect to some arbitrary service data stored in a particular tier of a storage area the storage server 300 transfers the service data to the storage area in a tier lower than where the service data is currently stored, or transfers the service data to the storage area in a tier higher than where the service data is currently stored.

According to the present invention the management server 100 controls where the service data is stored by taking the tiered storage area 330 as well as the storage cache 320 into consideration. That is, the computer system according to the present invention executes the tier control process in a manner different from the way the conventional storage apparatuses execute tier control processes.

By virtue of such control technique the following effects are obtained according to the present invention.

The management server 100 can store service data in the most optimal storage location within the storage server 300 in a manner corresponding to the operation status of each service server 200 executing its service. Accordingly, it becomes possible to improve the processing capability of the application 220. The cache driver 213 executes a cache control process with respect to the service data stored in the storage area provided by the storage server 300.

Accordingly, the management server 100 is operable to optimize the storage location of the service data in the storage server 300 in accordance with the operation status of the computer system executing its service while each cache driver 213 is operable to improve the execution performance of the application 220 in the computer system as a whole by executing the control process of the storage location of the service data with fine granularity in a block unit basis such as the cache control process of the service data, for example.

Further, the present invention is operable to minimize the lowering of the performance of the plurality of service servers 200 and storage servers 300 while the service servers 200 and storage servers 300 become operable to corporate with one another in an organic manner.

First Embodiment

According to first embodiment the management server 100 obtains information related to cache hit ratio on the server cache 230 from the cache driver 213 of each service server 200, and controls the storage location of service data in the storage server 300 in accordance with the obtained information.

Note that the service data according to the present embodiment may be in a file format and that the service data in a file format may also be referred to simply as file in the description herein. It is also to be noted that the service data according to the present invention is not limited to data in a file format.

Figure 2:
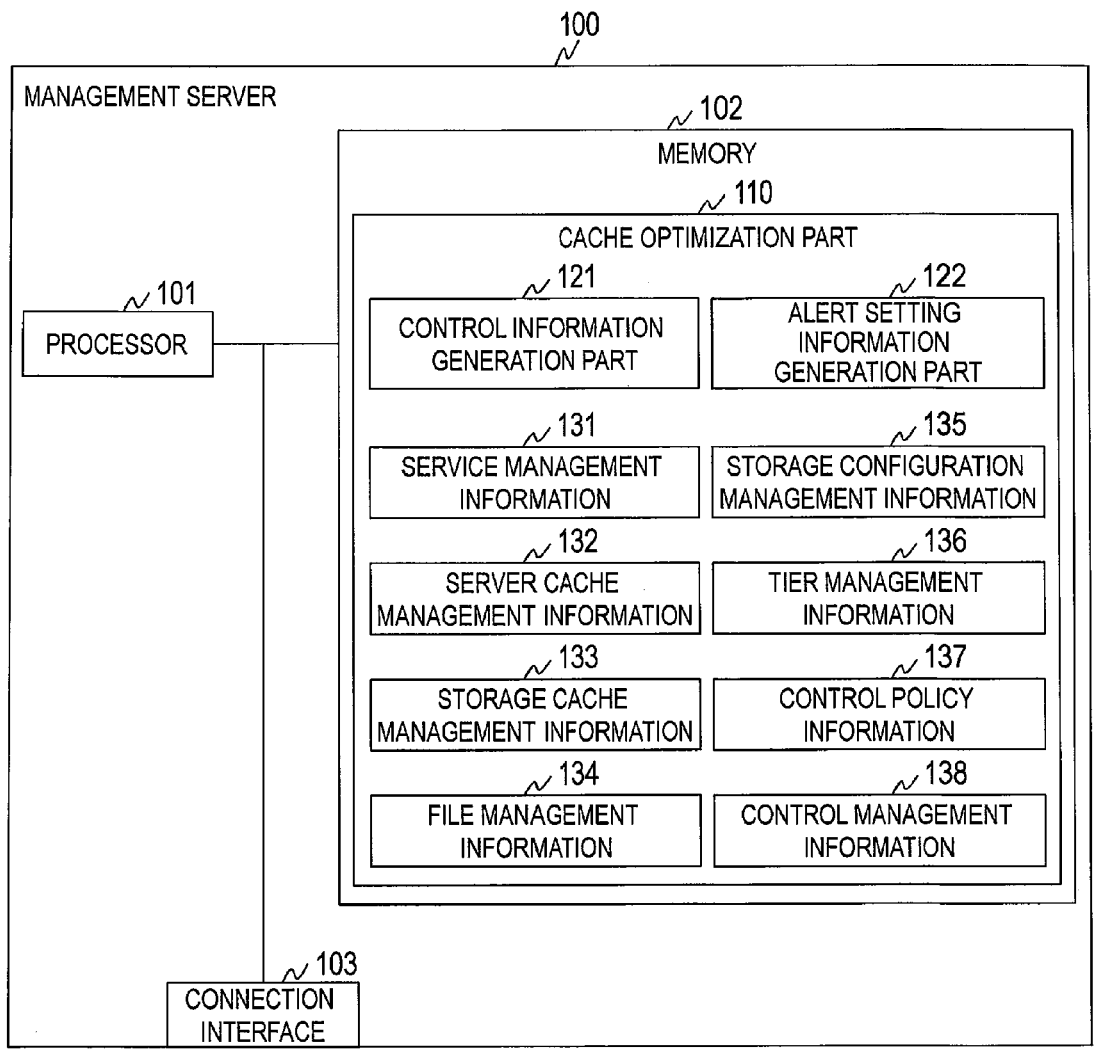
FIG. 2 is a block diagram illustrating an example of a configuration of a management server according to a first embodiment.

FIG. 2 is a block diagram illustrating an example of a configuration of the management server 100 according to the first embodiment.

The management server 100 includes a processor 101, a memory 102, and a connection interface 103 wherein each component is connected with one another via an internal path. Note that the management server 100 according to the present embodiment may also include a storage apparatus such as a hard disk drive (HDD) or the like, or an input-output apparatus such as a keyboard, a mouse, a touch panel, a display, or the like.

The processor 101 executes a program stored in the memory 102. When the processor 101 executes the program, functions of the management server 100 are implemented. Note that when a process is described with a function implemented by a program as the main content of the description herein, the process refers to the implementation of the program whose function is implemented by the processor 101.

The memory 102 stores therein the program which will be executed by the processor 101 and information necessary for the execution of the program. The details of the program and the information stored in the memory 102 will be described below.

The connection interface 103 is a device configured to connect the management server 100 with external apparatuses such as the plurality of service servers 200, the storage servers 300 or like that, via the management network 400. For example, in a case where the management server 100 and the storage server 300 are connected with one another via SAN, an FC (Fiber Channel) adapter card will be used as the connection interface 103. Further, in a case where the management server 100 and the storage server 300 are connected with one another via LAN, an NIC (Network Interface Card) will be used as the connection interface 103.

Hereinafter, the program and the information stored in the memory 102 will be described. The memory 102 according to the present embodiment stores therein a program designed to implement a cache optimization part 110. The cache optimization part 110 controls the storage location of data in the storage server 300 in cooperation with the cache driver 213 of the service server 200.

The cache optimization part 110 includes a plurality of program modules and management information. To be more specific, the cache optimization part 110 includes a program module configured to implement a control information generation part 121 and an alert setting information generation part 122, a service management information 131, a server cache management information 132, a storage cache management information 133, a file management information 134, a storage configuration management information 135, a tier management information 136, control policy information 137, and control management information 138.

The control information generation part 121 generates the information related to a command, or the like, necessary for executing a cache control process on the storage cache 320 and a tier control process on a storage area. The generated information is stored in the control management information 138. The alert setting information generation part 122 generates alert setting information used to set a notification which triggers a change of the storage location of a file.

The service management information 131 stores therein information related to the service implemented by each service server 200. The details of the service management information 131 will be described below with reference to FIG. 6. The server cache management information 132 stores therein information related to the server cache 230 of each service server 200. The details of the server cache management information 132 will be described below with reference to FIG. 7. The storage cache management information 133 stores therein information related to the storage cache 320 of the storage server 300. The details of the storage cache management information 1333 will be described below with reference to FIG. 8.

The file management information 134 stores therein information related to a logical device in which service data (file) is stored. The details of the file management information 134 will be described below with reference to FIG. 9. The storage configuration management information 135 stores therein information related to the storage area provided by the storage server 300. The details of the storage configuration management information 135 will be described below with reference to FIG. 10. The tier management information 136 stores therein information related to the tier structure of the tiered storage area 330 in the storage server 300. The details of the tier management information 136 will be described below with reference to FIG. 11.

The control policy information 137 stores therein policy related to the control contents of the storage location of files. The details of the control policy information 137 will be described below with reference to FIG. 12. The control management information 138 includes information used to control the storage area where files are stored and information generated by the control information generation part 121. The details of the control management information 138 will be described below with reference to FIG. 13.

Figure 3:
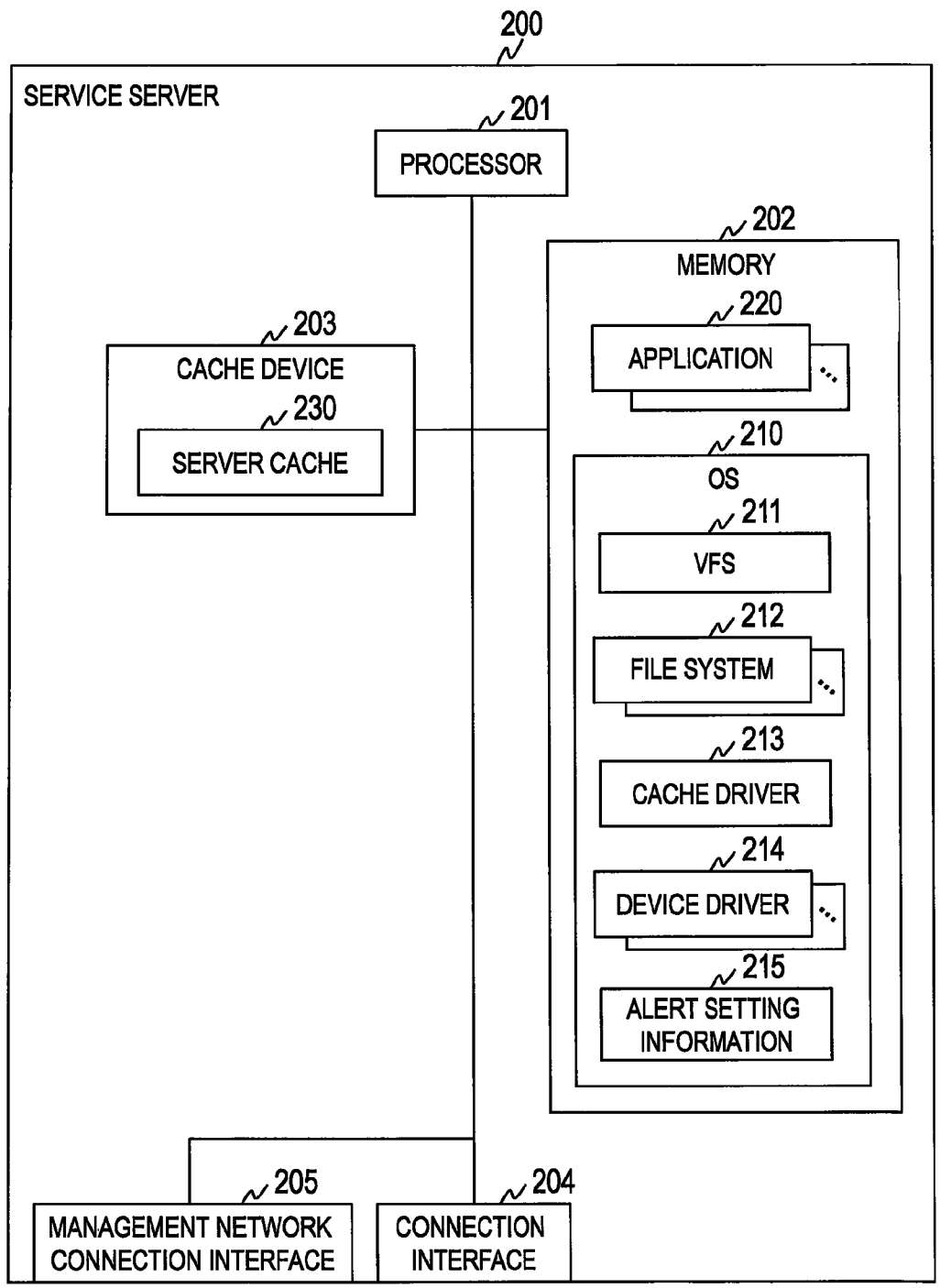
FIG. 3 is a block diagram illustrating an example of a configuration of a service server according to the first embodiment.

FIG. 3 is a block diagram illustrating an example of a configuration of the service server 200 according to the first embodiment.

The service server 200 includes a processor 201, a memory 202, a cache device 203, a connection interface 204, and a management network connection interface 205 wherein each component is connected with one another via an internal path. Note that the service server 200 according to the present embodiment may also include a storage apparatus such as a hard disk drive (HDD) or the like, or an input-output apparatus such as a keyboard, a mouse, a touch panel, a display, or the like.

The processor 201 executes a program stored in the memory 202. When the processor 201 executes the program, functions of the service server 200 are implemented. Note that when a process is described with a function implemented by a program as the main content of the description herein, the process refers to the implementation of the program whose function is implemented by the processor 201.

The memory 202 stores therein the program which will be executed by the processor 201 and information necessary for the execution of the program. The details of the program and the information stored in the memory 202 will be described below.

The cache device 203 is a device configured to implement the server cache 230 which temporarily stores therein the service data accessed by the application 220. The entire storage area of the cache device 203 will be used as the server cache 230. The cache device 203 according to the present embodiment includes an SSD (Solid State Drive) having a Flash memory. It is to be noted that the cache device 203 is not limited to a non-volatile memory such as Flash memory, and may include a volatile memory such as DRAM.

The server cache 230 according to the present embodiment stores therein data of a logical device in a logic block unit. The server cache 230 may include, for example, a buffer cache. The buffer cache may be generated by allocating a buffer page to the server cache 230 and diving the buffer page into block buffers each having a predetermined block size.

The buffer cache includes a buffer head configured to specify the storage location of data in a logic block unit basis. Note that an LU is provided by the storage server 300 in a manner which will be described below. Also note that in the description herein data in logical block unit will also be referred to as block data.

It is to be noted that the service server 200 according to the present embodiment recognizes the logical device provided by the storage server 300 as a physical storage device. Also, the storage server 300 according to the present embodiment provides a storage area usable to the service server 200 by allocating at least one LU to the logical device. It is also to be noted that the present invention is not limited to a method to provide storage areas. For example, the storage server 300 may provide a storage area to the service server 200 by allocating at least one LU to the logical device.

The connection interface 204 is a device configured to connect the service server 200 with external apparatuses including the storage server 300, or the like, via the service network 410. The management network connection interface 205 is a device configured to connect the service server 200 with the management server 100 via the management network 400. Note that the connection interface 204 and the management network connection interface 205 may be realized by a single interface.

Hereinafter the program and the information stored in the memory 202 will be described. The memory 202 according to the present embodiment stores therein a program configured to implement an OS (Operating System) 210 and the application 220. Note that the memory 202 may store therein programs and information other than those described herein.

The OS 210 provides a function designed to control the service server 200, and controls the data transmission conducted between the service server 200 and the logical device. The OS 210 includes a VFS 211, a file system 212, a cache driver 213, a device driver 214, and an alert setting information 215. Note that while the OS 210 includes other components therein, the detailed description of such other components will be omitted since they are well known in the art.

The VFS (Virtual File System) 211 provides a common interface to the file systems 212 of multiple different types. The VFS 211 coverts an operation (i.e., reading, writing, etc.,) carried out by the application 220 with respect to service data into an operation specific to each of the file system 212. By this, it becomes possible for the application 220 to access devices from various types of file systems via the same operation means. Further, the VFS 211 holds the management information of the file system 212 and the information specific to the file system 212. The VFS 211 holds, for example, a super block object, an inode object, a file object, and a dentry object, or the like.

The file system 212 provides a function whereby the data stored in a block unit in a storage area is managed as a file. Note that the OS 210 according to the present embodiment includes multiple file systems 212. However the OS 210 may include only one file system 212.

The OS 210 recognizes the logical device provided by the storage server 300 as a physical storage device, and formats the logical device (i.e., the LU allocated to the logical device) into the predetermined file system 212. At this point, the OS 210 divides the logical device into predetermined logical blocks and assigns each logical block with an identification number. The file system 212 manages the data consisting of at least one block data as a file.

The cache driver 213 controls the cache device 203. The device driver 214 controls the devices including the connection interface 204 or the like which the service server 200 has.

The alert setting information 215 stores therein setting information used to set a notification which triggers a change of the file arrangement to the management server 100. The service server 200 according to the present embodiment transmits alert information which includes the status of the server cache 230 and/or service status, or the like, to the management server 100. The details of the alert setting information will be described with reference to FIG. 14.

The application 220 executes arbitrary services. It is to be noted that the present invention is not limited to the types or the service contents of the application 220 executed on the service server 200.

Note that the program and the information stored in the memory 202 may be stored in the storage area provided by the storage server 300 and/or the storage apparatus which the service server 200 has. When the program or the information are stored in the storage area provided by the storage server 300 or the storage apparatus which the service server 200 has, the processor 201 obtains the program or the information from the storage server 300 or the storage apparatus and loads the obtained program or information onto the memory 202.

Figure 4:
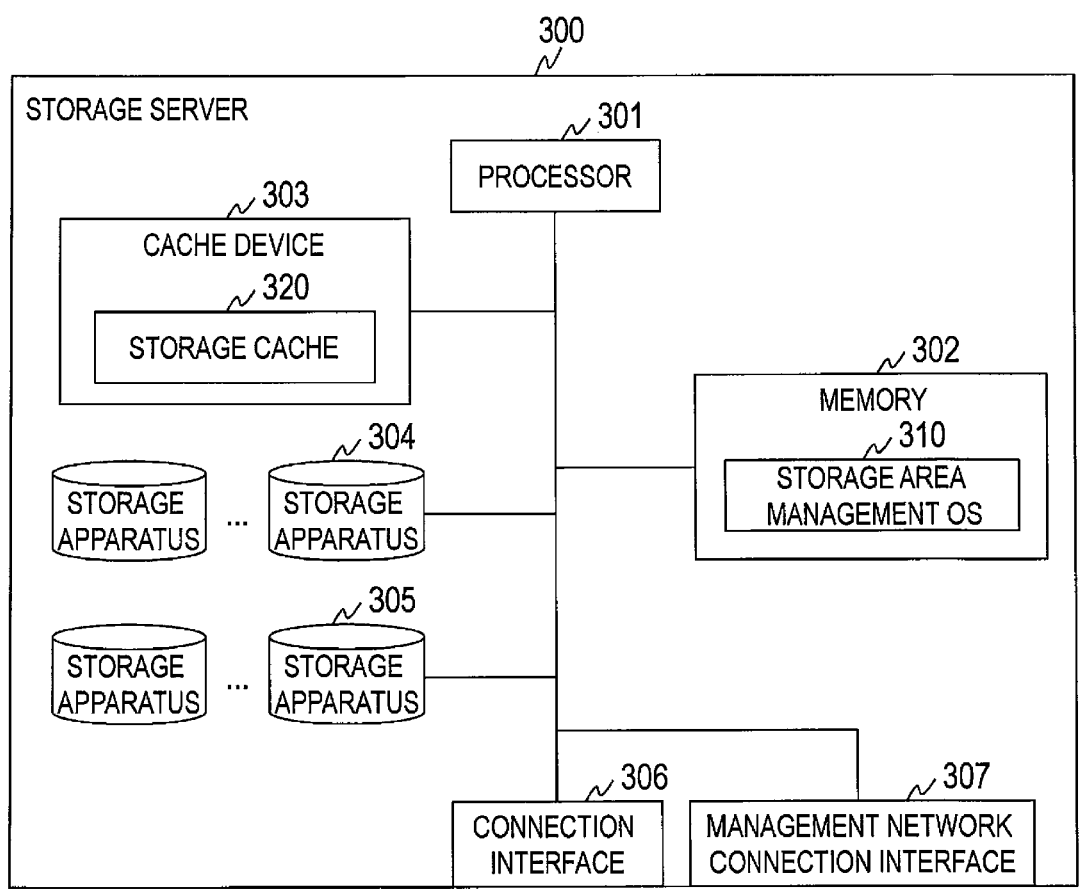
FIG. 4 is a block diagram illustrating an example of a configuration of a storage server according to the first embodiment.

FIG. 4 is a block diagram illustrating an example of a configuration of the storage server 300 according to the first embodiment.

The storage server 300 provides a storage area to the service server 200. The storage server 300 includes a processor 301, a memory 302, a cache device 303, a plurality of storage apparatuses 304, a plurality of storage apparatuses 305, a connection interface 306, and a management network connection interface 307, wherein each component is connected with one another via an internal path. Note that the storage server 300 may include an input/output apparatus. The input/output apparatus may include a keyboard, a mouse, a touch panel, or a display, or the like.

The processor 301 executes a program stored in the memory 302. When the processor 301 executes the program, functions of the storage server 300 are implemented. Note that when a process is described with a function implemented by a program as the main content of the description herein, the process refers to the implementation of the program whose function is implemented by the processor 301.

The memory 302 stores therein the program which will be executed by the processor 301 and information necessary for the execution of the program. The details of the program and the information stored in the memory 302 will be described below.

The cache device 303 is a device configured to implement the storage cache 320 which temporarily stores therein the service data accessed by the service server 200. The entire storage area of the cache device 303 will be used as the storage cache 320.

Note that the storage area management OS 310 includes a cache driver which implements the cache control process with respect to the storage cache 320. Note that since the cache driver is well known in the art, the detailed depiction thereof will be omitted.

Note that the cache device 303 according to the present embodiment includes an SSD (Solid State Drive) having a Flash memory. Also note that the cache device 303 is not limited to a non-volatile memory such as Flash memory, and may include a volatile memory such as SRAM.

In the event of receiving a readout request from the service server 200, the cache driver of the storage server 300 responds with the data stored in the storage cache 320. In the event of receiving a write request from the service server 200, the storage server 300 writes data into the storage cache 320, notifies the completion of the process to the service server 200, and then, writes data into the storage apparatus 304 and/or the storage apparatus 305. By such process, it becomes possible to accelerate the process of responding to the requests from the service server 200.

The connection interface 306 is a device configured to connect the storage server 300 with an external apparatus such as the service server 200, or the like, via the service network 410. For example, in a case where the storage server 300 and the service server 200 are connected with one another via SAN, a CA (Channel Adapter) will be used as the connection interface 306. Further, in a case where the storage server 300 and the service server 200 are connected with one another via LAN, a NIC (Network Interface Card) will be used as the connection interface 306.

The management network connection interface 307 is a device configured to connect the storage server 300 with the management server 100 via the management network 400.

The storage apparatus 304 and the storage apparatus 305 each include apparatuses to store therein data. The storage apparatus 304 and the storage apparatus 305 may include an HDD or an SSD, or any other apparatus operable to store therein data. According to the present embodiment, the storage apparatus 304 includes a high speed HDD, while the storage apparatus 305 includes a low speed HDD.

Hereinafter, the program and the information stored in the memory 302 will be described. The memory 302 according to the present embodiment stores therein a program for implementing the storage area management OS 310. Note that the memory 302 may store therein programs and information other than those described herein. For example, the memory 302 may store therein information or the like used to manage the data stored in the storage apparatus 304 and the storage apparatus 305.

The storage area management OS 310 controls the storage server 300. According to the present embodiment, the plurality of the storage apparatuses 304 and the storage apparatuses 305 comprise a RAID volume. The storage area management OS 310 generates a plurality of LUs (Logical Unit) by logically dividing the RAID volume. Note that each RAID volume includes therein a storage area having a tiered structure.

The storage area management OS 310 provides at least one logical device to the service server 200, and allocates at least one LU to the logical device. In a case where a plurality of LUs are allocated to the logical device, LUs generated from various tiers of RAID volumes may be allocated.

The storage area management OS 310 holds the management information which indicates the correlation among the RAID volume, LU, and logical device. In other words, the storage area management OS 310 holds the information corresponding to the storage configuration management information 135. In the event of receiving an access request from the service server 200 to access the logical device, the storage area management OS 310 identifies, in accordance with the management information, the LU allocated to the logical device, and accesses either the storage apparatus 304 or the storage apparatus 305 which provides a storage area (logical block) comprising the LU. Further, the storage area management OS 310 includes various types of functions such as a function to manage LU, a function to transmit data, and a function to control caches, or the like. However, since such functions are well known in the art, the detailed descriptions thereof will be omitted.

Note that the program and the information stored in the memory 302 may be stored in the storage apparatus 304 and/or the storage apparatus 305. When the program and the information stored, according to the present embodiment, at the memory 302 are stored in the storage apparatus 304 and the storage apparatus 305, the processor 301 obtains the program or the information from the storage apparatus 304 and the storage apparatus 305 and loads the obtained program or information onto the memory 302.

Figure 5:
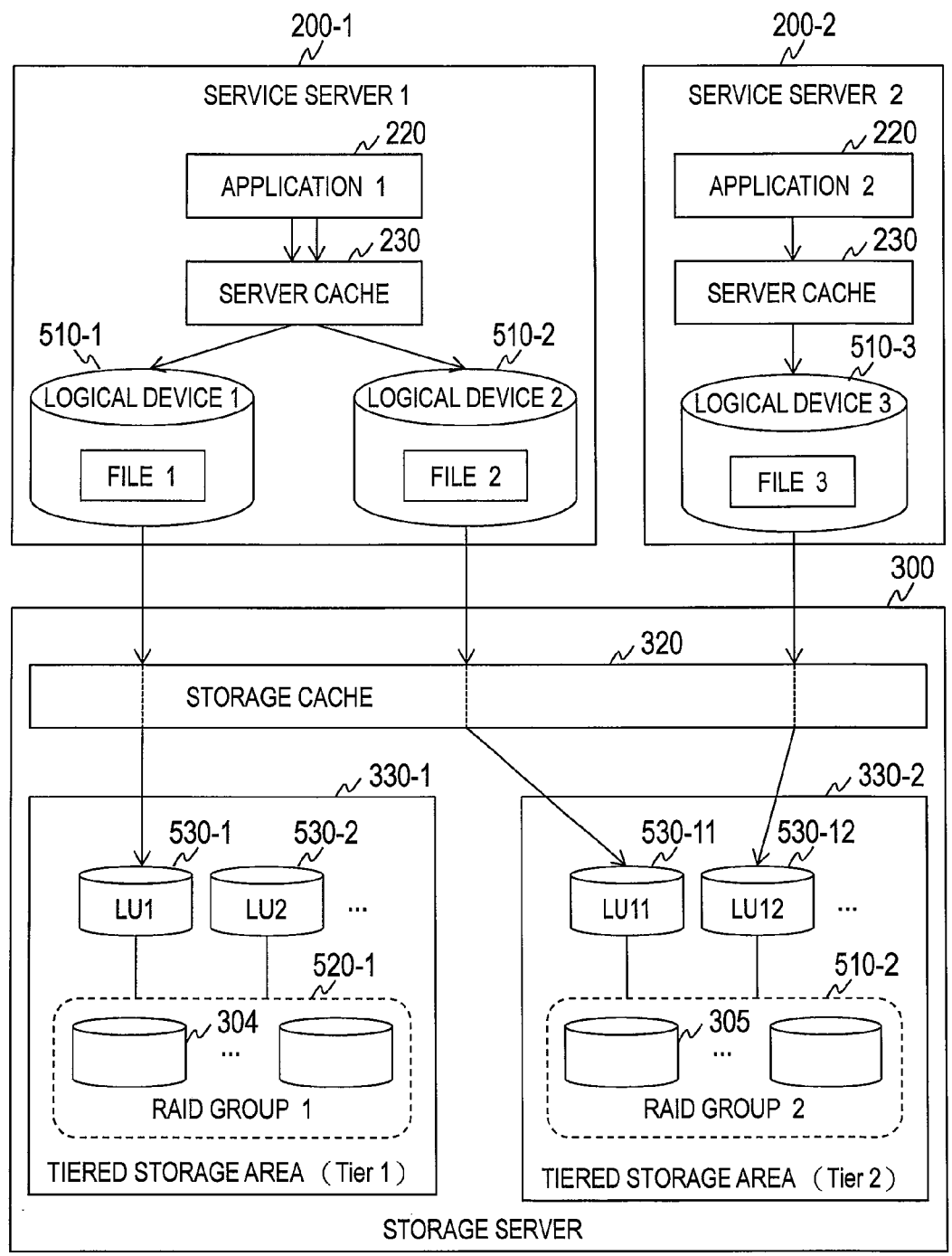
FIG. 5 is an explanatory diagram illustrating a flow of processes performed in a case where an application accesses a file according to the first embodiment.

FIG. 5 is an explanatory diagram illustrating a flow of processes performed in a case where the application 220 accesses a file according to the first embodiment.

As illustrated in FIG. 5, according to the present embodiment a plurality of storage apparatuses 304 comprise a RAID group 1 (520-1), while a plurality of storage apparatuses 305 comprise a RAID group 2 (520-2). Further, the RAID group 1 (520-1) comprises a tiered storage area 330-1 arranged at a higher tier, while the RAID group 2 (520-2) comprises a tiered storage area 330-2 arranged at a lower tier.

A logical device 1 (510-1) and a logical device 2 (510-2) are provided to a service server 1 (200-1). The logical device 1 (510-1) is allocated with an LU 1 (530-1) which is generated from the RAID volume of the RAID group 1 (520-1), while the logical device 2 (510-2) is allocated with an LU 11 (530-11) which is generated from the RAID volume of the RAID group 2 (520-2). Further, a logical device 3 (510-3) is provided to a service server 2 (200-2). The logical device 3 (510-3) is allocated with an LU 12 (530-12) which is generated from the RAID group 2 (510-2).

Hereinafter, a summary of the process which is performed when an access request is issued for the application 220 to access a file stored in the logical device 510 will be described. Note that portions of the process that are well known in the art will be omitted from the detailed description.

In a case where the cache driver 213 receives the access request from the application 220 to access a file stored in the logical device 510, the cache driver 213 makes a determination as to whether or not the cache data of the file is stored in the server cache 230.

In a case where the cache data of the file to be accessed is stored in the server cache 230, the cache driver 213 executes an access process (readout process or write process) with respect to the cache data. In a case where the cache data of the file to be accessed is not stored in the server cache 230, the cache driver 213 transmits to the storage server 300 the access request requesting an access to the logical device 510.

In a case of receiving the access request from the cache driver 213, the storage area management OS 310 makes a determination as to whether or not the cache data of the file to be accessed is stored in the storage cache 320.

In a case where it is determined that the cache data of the file to be accessed is stored in the storage cache 320, the storage area management OS 310 executes the access process (readout process or write process) with respect to the cache data. In a case where it is determined that the cache data of the file to be accessed is not stored in the storage cache 320, the storage area management OS 310 identifies the LU allocated to the logical device 510 and executes the access process (readout process or write process) with respect to the file stored in the identified LU.

The processing capability of the application 220 depends on the storage location of files. The access performance, in the order from high to low, is provided to the server cache 230, the storage cache 320, the tiered storage area 330-1, and the tiered storage area 330-2.

Accordingly, in order to increase the processing capability of the application 220, the service data (file) may be stored in the server cache 230. However, since the server cache 230 has its capacity limit, not all the service data may be stored in the server cache 230. Accordingly, in order to maintain high processing capability of the application 220, the service data may need to be stored in the storage cache 320 or the tiered storage area 330-1.

The cache driver 213 performs cache control only with respect to the data used by the application 220 running on the service server 200. Further, since the storage cache 320 also has its capacity limit, a usage status of the tiered storage area 330 on each tier changes in accordance with the operation status. Furthermore, the cache driver 213 is inoperable to grasp the status of the storage cache 320.

Because of this, it is difficult for the cache driver 213 to link with the application 220 running on another service server 220 in a coordinated manner. Further, when each cache driver 213 and the storage server 300 attempt to link with one another, a large amount of management information will be required, which will necessitate communications between the multiple service servers 200 and the storage servers 300 thereby increasing non-service related processes. Thus, the goal to increase the processing capability of the application 220 will not be achieved. Moreover, when the storage server 300 attempts to link with the storage server 300 and each service server 200, the same issue occurs.

Accordingly, the management server 100 controls the storage location of the service data (file) in the storage server 300 in accordance with the operation status of each service server 200, the status of each server cache 230, and the status of the storage server 300, or the like, such as to optimize the performance capability of the applications of the entire computer system.

Next, the details of the information which the management server 100 holds will be described.

FIG. 6 is an explanatory diagram illustrating an example of the service management information 131 according to the first embodiment.

The service management information 131 stores therein the information related to the service performed on each service server 200. To be more specific, the service management information 131 includes a service ID 601, a service server ID 602, an application ID 603, a file ID 604, a schedule 605, a related service ID 606, a priority 607, and a status 608.

The service ID 601 is an identifier configured to identify each service. The service server ID 602 is an identifier of the service server 200 executing the service corresponding to the service ID 601. The application ID 603 is an identifier of the application 220 implementing the service corresponding to the service ID 601.

The file ID 604 is an identifier of the file used for the service corresponding to the service ID 601. The schedule 605 is an execution schedule (i.e., execution time) of the service corresponding to the service ID 601.

The related service ID 606 is an identifier of the service which will be executed after the service corresponding to the service ID 601. In a case where there is no related service, the column for the related service ID 601 will remain blank. In the description herein of the present embodiment, a job net comprised of at least one service will be subject for execution, and thus, the column for the related service ID 606 corresponding to the last service of the job net will remain blank.

The priority 607 is an indicator expressing the priority of each service. In the description of the present embodiment herein, the smaller the value of the priority 607 is, the higher the priority of the service will be. According to the present example, the priority 607 will be indicated in the column corresponding only to the first service of the job net.

The status 608 indicates the operation status of the service corresponding to the service ID 601. According to the present example, the columns for the status 608 include "currently executed" to indicate the service is being executed, "execution in waiting," and "operation finished," or the like.

The information of the service management information 131 may include the information obtained from each service server 200 and/or predetermined information.

FIG. 7 is an explanatory diagram illustrating an example of the server cache management information 132 according to the first embodiment.

The server cache management information 132 stores therein information related to the status of the server cache 230 of each service server 200. To be more specific, the server cache management information 132 includes a service server ID 701, a cache capacity 702, a usage 703, a cache hit ratio 704, an upper limit 705, and a lower limit 706.

The service server ID 701 is an identifier configured to identify the service server 200, and is the same as the service server ID 602. The cache capacity 702 indicates the entire capacity of the server cache 230. The usage 703 indicates the usage of the server cache 230. The cache hit ratio 704 indicates a cache hit ratio with respect to the cache data stored in the server cache 230.

The upper limit 705 and the lower limit 706 are configured to provide the thresholds for the cache hit ratio used to determine an execution trigger for a storage location change process which will be described below. According to the present embodiment, in a case where the cache hit ratio is greater than the upper limit 705, or in a case where the cache hit ratio is smaller than the lower limit 706, the storage location change process will be executed.

The service server ID 701, the cache capacity 702, the usage 703, and the cache hit ratio 704 are set up in accordance with the information obtained from the service server 200. On the other hand, the upper limit 705 and the lower limit 706 are set up in accordance with the information obtained from the management server 100.

FIG. 8 is an explanatory diagram illustrating an example of the storage cache management information 133 according to the first embodiment.

The storage cache management information 133 stores therein information related to the status of the storage cache 320. To be more specific, the storage cache management information 133 includes a cache capacity 801 and a usage 802.

The cache capacity 801 indicates the entire capacity of the storage cache 320. The usage 802 indicates the usage of the storage cache 320.

The storage cache management information 133 is set up by using a free command, or the like, in accordance with the information obtained from the storage server 300.

FIG. 9 is an explanatory diagram illustrating an example of the file management information 134 according to the first embodiment.

The file management information 134 stores therein information related to the storage location of a file recognized by the application 220. To be more specific, the file management information 134 includes a file ID 901, an LDEV ID 902, and a data capacity 903.

The file ID 901 is an identifier used to identify each file. The LDEV ID 902 is an identifier of the logical device 510 which stores therein the file corresponding to the file ID 901. The data capacity 903 indicates the size of the file corresponding to the file ID 901.

The file management information 134 is set up in accordance with the information obtained from the storage server 300.

FIG. 10 is an explanatory diagram illustrating an example of the storage configuration management information 135 according to the first embodiment.

The storage configuration management information 135 stores therein information related to the configuration of the storage area of the storage server 300. To be more specific, the storage configuration management information 135 includes an LU ID 1001, a service server ID 1002, an LDEV ID 1003, a RAID group ID 1004, a server port ID 1005, and a storage port ID 1006.

The LU ID 1001 is an identifier used to identify the LU 530. The service server ID 1002 is an identifier of the service server 200 to which the LU 530 corresponding to the LU ID 1001 is provided. The service server ID 1002 is the same as the service server ID 602. The LDEV ID 1003 is an identifier of the logical device 510 to which the LU 530 corresponding to the LU ID 1001 is allocated. The LDEV ID 1003 is the same as the LDEV ID 902. The RAID group ID 1004 is an identifier of the RAID group to which the LU 530 corresponding to the LU ID 1001 belongs.

The server port ID 1005 is an identifier of the port of the service server 200 which is used when the service server 200 accesses the LU 530 corresponding to the LU ID 1001. The storage port ID 1006 is an identifier of the port of the storage server 300 which is used when access requests are accepted for the LU 530 corresponding to the LU ID 1001.

The storage configuration management information 135 stores therein the information obtained from the storage server 300.

FIG. 11 is an explanatory diagram illustrating an example of the tier management information 136 according to the first embodiment.

The tier management information 136 stores therein the information related to the configuration of the tiered storage area 330. To be more specific, the tier management information 136 includes a tier ID 1101, and a belonging LU ID 1102.

The tier ID 1101 is an identifier used to identify the tier of the tiered storage area 330. The belonging LU ID 1102 is an identifier used to identify the LU 530 configuring the tiered storage area 330, and is the same as the LU ID 1001.

The tier management information 136 stores therein the information obtained from the storage server 300.

FIG. 12 is an explanatory diagram illustrating an example of the control policy information 137 according to the first embodiment.

The control policy information 137 stores therein the information related to the process contents of the storage location change process. To be more specific, the control policy information 137 includes a policy ID 1201, a control condition 1202, and a control content 1203. The control policy information 137 is configured by an administrator in advance, and is subject to future changes as necessary.

The policy ID 1201 is an identifier used to identify the control policy. The control condition 1202 indicates control conditions used to decide control contents. For example, in a case of deciding the control policy based on the cache hit ratio, the control condition 1202 stores therein "cache hit ratio." Also, in a case of deciding the control policy based on the service schedule, the control condition 1202 stores therein "batch job."

The control content 1203 stores therein specific details of the content performed during the storage location change process. Hereinafter, the control contents of the "cache hit ratio" and the "batch job" will be described.

First, the control contents of the "cache hit ratio" will be described. The control contents related to service server 200 store therein the information used to set up a notification time of the server cache information when the cache hit ratio is notified. Further, the control contents related to the storage server 300 stores therein the upper limit and the lower limit of the cache hit ratio, the details of the cache control performed by the storage cache 320, and the detail contents of the tier control of the tiered storage area 330.

Note that while the upper limit and the lower limit of the cache hit ratio of all of the service servers 200 according to the present embodiment are described as having the same values, the present invention is not limited thereto. For example, the upper limit and the lower limit of the cache hit ratio may be set up in accordance with the type of application or the capacity of the server cache 230, or the like.

Next, the control contents of the "batch job" will be described. The control content related to service server 200 stores therein the contents of the notification which is used to notify the beginning and the end a service. The control content of the storage server 300 stores therein the control contents for each tier control performed by the storage server 300.

FIG. 13 is an explanatory diagram illustrating an example of the control management information 138 according to the first embodiment.

The control management information 138 stores therein the information related to the control contents which have been determined based on the storage location change process. To be more specific, the control management information 138 includes cache control information 1300 and tier control information 1310.

The storage location change process includes two control processes; the cache control performed with respect to the storage cache 320, and the tier control performed with respect to the tiered storage area 330. Accordingly, the control management information 138 includes the cache control information 1300 configured to store therein the information related to the cache control performed with respect to the storage cache 320, and the tier control information 1310 configured to store therein the information related to the tier control performed with respect to the tiered storage area 330.

The cache control information 1300 includes a service ID 1301, a file ID 1302, a type 1303, and a command 1304.

The service ID 1301 is an identifier of the service which uses a file to be processed, and is the same as the service ID 601. The file ID 1302 is an identifier of the file to be processed, and is the same as the file ID 604.

The type 1303 indicates the type of control contents performed with respect to the file corresponding to the file ID 1302. In a case where the type 1303 indicates "add," the control process to store cache data of the file in the storage cache 320 is executed, while in a case where the type 1303 indicates "delete," the control process to discharge the cache data of the file from the storage cache 320 is executed.

The command 1304 is a command configured to signal specific contents of the cache control to the storage server 300. For example, the command 1304 stores therein a controller command configured to control an SCSI command and/or the cache device 303.

The tier control information 1310 includes, in the same manner as the cache control information 1300, a service ID 1311, a file ID 1312, a type 1313, and a command 1314. Note that since the service ID 1311, the file ID 1312, and the type 1313 are the same as the service ID 1311, the file ID 1312, and the type 1313, the description thereof will be omitted. The command 1314 stores therein a controller command configured to control the SCSI command and/or the storage apparatuses 304 and 305.

FIG. 14 is an explanatory diagram illustrating an example of the alert setting information 215 according to the first embodiment.

The alert setting information 215 stores therein setting information which is used to notify the status of the server cache 230 as a trigger to change file arrangement to the management server 100. To be more specific, the alert setting information 215 stores therein a notification timer which indicates a notification cycle via which the cache driver 213 notifies the status of the server cache 230.

Next, processes executed according to the first embodiment will be described.

Figure 15:
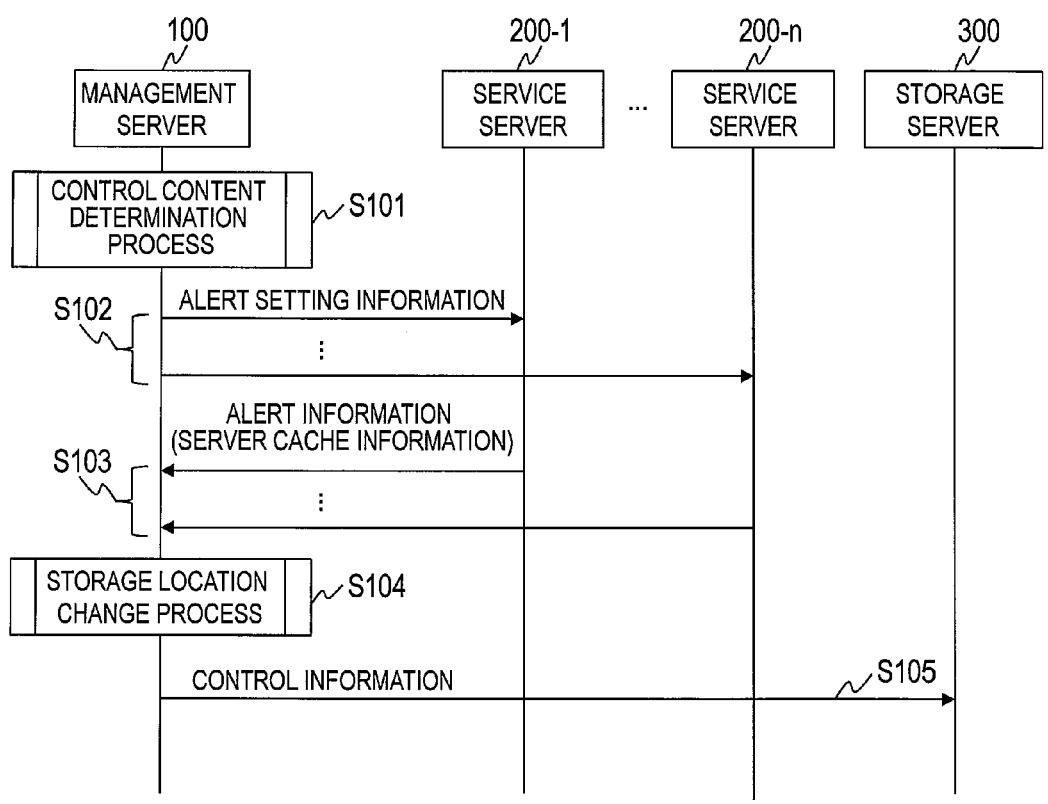
FIG. 15 is a sequence diagram for explaining the flow of a process according to the first embodiment.

FIG. 15 is a sequence diagram for explaining the flow of the process according to the first embodiment.

First, the management server 100 executes a control content determination process in order to determine control contents (Step S101). The control content determination process generates the alert setting information 215. The details of the control content determination process will be described below with reference to FIG. 16. According to the present embodiment an administrator, or the like, specifies the "cache hit ratio" as the control condition.

Note that the control content determination process may be executed either during or prior to the operation of the computer system. Also note that the control content determination process may be executed when a new service server 200 is added to the system.

The management server 100 transmits the generated alert setting information 215 to the plurality of service servers 200 (Step S102). The management server 100 may transmit the alert setting information to each service server 200 via multicast transmission. Note if the current process is executed in response to a new service server 200 being added to the system, the management server 100 transmits the alert setting information 215 only to that service server 200.

Each service server 200 stores the received alert setting information 215 in the memory 202. According to the present embodiment the alert setting information 215 as illustrated in FIG. 14 is stored.

The cache driver 213 of each service server 200 transmits the alert information including the status of the server cache 230 to the management server 100 in a periodical manner in accordance with the notification timer of the alert setting information 215 (Step S103). According to the present embodiment, the server cache information includes the cache hit ratio of the server cache 230 and the identifier of the service currently being executed. Note that the identifier of service may be obtained by the cache driver 213 making an inquiry to the OS 210 prior to the transmission of the server cache information.

The management server 100 executes the storage location change process based on the received server cache information (Step S104). Further, the management server 100 transmits the control information to the storage server 300 based on the result of the execution of the storage location change process (Step S105). The details of the storage location change process will be described below with reference to FIG. 17, FIG. 18 and FIG. 19.

Figure 16:
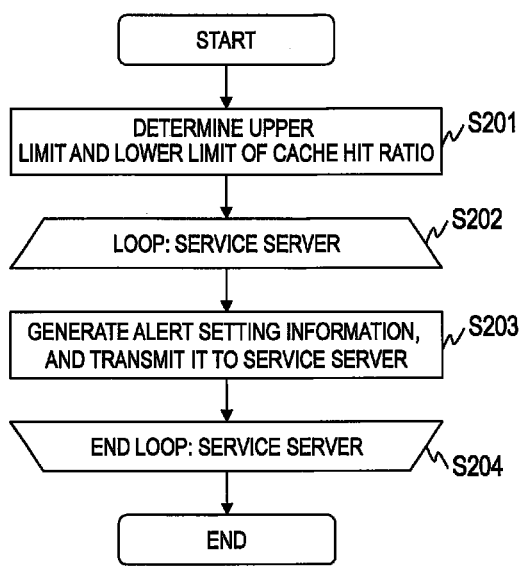
FIG. 16 is a flowchart illustrating control content determination process according to the first embodiment.

FIG. 16 is a flowchart illustrating the control content determination process according to the first embodiment.

The cache optimization part 110 refers to the control policy information 137 in order to determine the upper limit and the lower limit of the cache hit ratio set for each service server 200 (Step S201). To be more specific, the following process will be executed.

The cache optimization part 110 refers to the control condition 1202 of the control policy information 137 in order to search for an entry corresponding to the specified control condition. According to the present embodiment, since the "cache hit ratio" is specified as the control condition, the cache optimization part 110 searches for an entry which includes the "cache hit ratio" as the control condition 1202.

In a case where there are multiple entries whose control condition 1202 include the "cache hit ratio," the cache optimization part 110 may display a screen indicating an applicable control policy for an administrator or the like to choose from. Also, each entry may be preset with its own priority so that the cache optimization part 110 may select the control policy having the highest priority.

The cache optimization part 110 refers to the control content 1203 of the selected entry in order to determine the upper limit and the lower limit of the cache hit ratio for each service server 200. The cache optimization part 110 sets the determined upper limit and lower limit of the cache hit ratio as the upper limit 705 and the lower limit 706 of the server cache management information 132.

According to the present embodiment, since the same upper limit and lower limit of the cache hit ratio are set for all the service servers 200, the process to determine the upper limit and the lower limit of the cache hit ratio for each service server 200 does not necessarily need to be executed.

In a case where the upper limit and the lower limit of the cache hit ratio are set differently for each service server 200, the cache optimization part 110 determines the upper limit and the lower limit of the cache hit ratio for each service server 200 based on the control content 1203, the service management information 131, and the server cache management information 132, or the like.

For example, in a case where the upper limit and the lower limit of the cache hit ratio are defined for each type of application 220, the cache optimization part 110 specifies the type of application 220 based on the application ID 603 of the service management information 131, and determines the upper limit and the lower limit of the cache hit ratio based on the specified type of application.

The above is the description for the process in Step S201.

Next, the cache optimization part 110 calls the alert setting information generation part 122. The alert setting information generation part 122 which received the call selects an entry of the service server 200 to be processed from the server cache management information 132 (Step S202). Here, the entries on the server cache management information 132 are selected in order from the top.

The alert setting information generation part 122 refers to the control content 1203 in order to generate the alert setting information 215 including the notification timer, and transmits the generated alert setting information 215 to the service server 200 to be processed (Step S203). The alert setting information generation part 122 makes a determination as to whether or not the process has been completed with respect to all the service servers 200 (Step S204).

In a case where it is determined that the process has not been completed with respect to all the service servers 200, the alert setting information generation part 122 returns to Step S202 in order to execute the process therein.

In a case where it is determined that the process has been completed with respect to all the service servers 200, the alert setting information generation part 122 ends the process.

In a case where an addition of a new service server 200 is used as an execution trigger to start the process, the loop process concerning the service server 200 will not be executed, and the process of Step S203 will be executed with respect to the newly added service server 200.

Figure 17:
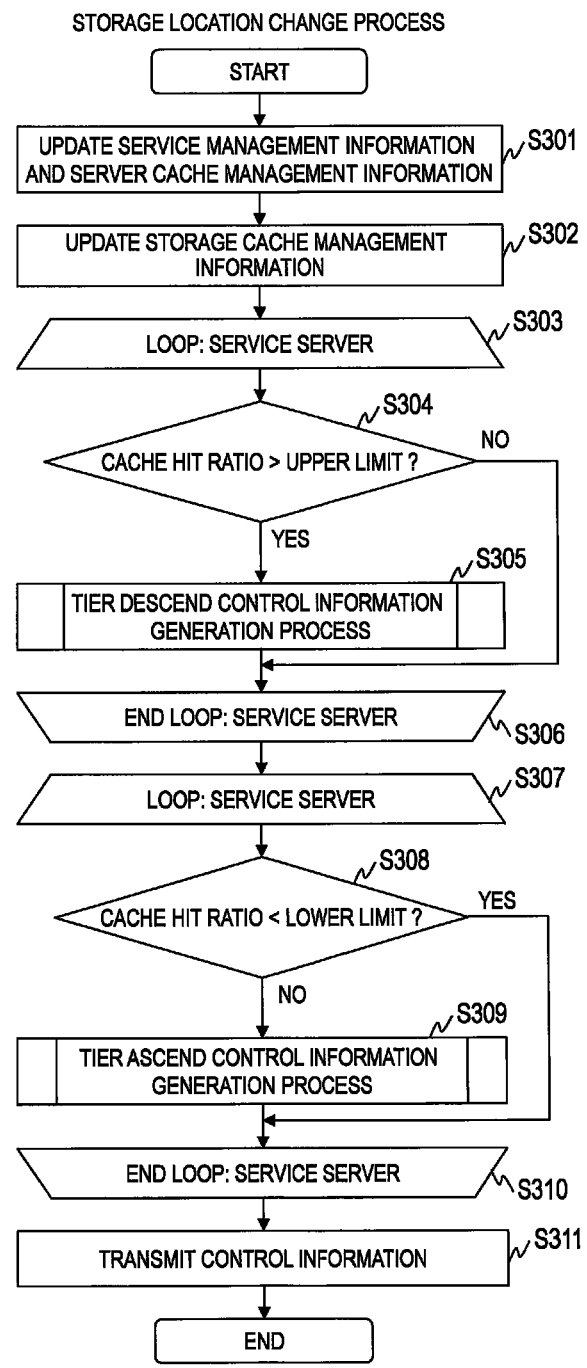
FIG. 17 is a flowchart illustrating storage location change process according to the first embodiment.

FIG. 17 is a flowchart illustrating the storage location change process according to the first embodiment.

The cache optimization part 110 calls the control information generation part 121 in a case of receiving the alert information. The control information generation part 121 which received the call executes the process as described below.

The control information generation part 121 updates the service management information 131 and the server cache management information 132 based on the server cache information received from each service server 200 (Step S301). To be more specific, the following process will be executed.

The control information generation part 121 refers to the service management information 131 in order to search for an entry in which the service ID 601 matches the identifier of the service included in the server cache information. The control information generation part 121 updates the status 608 of the entry retrieved from the search as "currently executed." Further, the control information generation part 121 updates the status 608 of the entry whose status 608 was "currently executed" prior to receiving the server cache information as "execution end."

The control information generation part 121 identifies from which service server 200 the server cache information was transmitted. For example, the control information generation part 121 is operable to identify from which service server 200 the server cache information was transmitted based on the transmission source information from a packet. The control information generation part 121 refers to the server cache management information 132 in order to search for an entry in which the service server ID 701 matches the service server 200 identified as the transmitted of the server cache information. The control information generation part 121 updates the cache hit ratio 704 of the entry retrieved from the search based on the cache hit ratio which is included in the server cache information.

The control information generation part 121 executes the above stated process in a repeated manner each time the server cache information is received.

The above is the description for the process in Step S301.

Next, the control information generation part 121 obtains the information indicating the status of the storage cache 320 from the storage server 300, and updates the storage cache management information 133 based on the obtained information (Step S302). The control information generation part 121 selects an entry of the service server 200 to be processed from the service management information 131 (Step S303). To be more specific, the following process will be executed.

The control information generation part 121 refers to the service management information 131 in order to search for an entry whose status 608 indicates "currently executed." The control information generation part 121 selects an entry of the service server 200 to be processed from the entries retrieved from the search. At this point, the control information generation part 121 selects entries from a job net which includes the service whose status 608 indicates "currently executed" in descending order according to the priority 607. In other words, the lower the priority of the entry of the service server 200 is, the sooner the entry will be selected.

The above is the description for the process in Step S303.

Next, the control information generation part 121 makes a determination as to whether or not the cache hit ratio of the service server 200 to be processed is greater than the upper limit (Step S304). To be more specific, the control information generation part 121 determines as to whether or not the value of the cache hit ratio 704 of the selected entry is greater than the value of the upper limit 705.

In a case where it is determined that the cache hit ratio of the service server 200 to be processed is smaller than the upper limit 705, the control information generation part 121 proceeds to Step S306.

In a case where it is determined that the cache hit ratio of the service server 200 to be processed is greater than the upper limit 705, the control information generation part 121 executes a tier descent control information generation process in order to change the storage location of the service data used by the service server 200 to be processed to a storage area at a lower tier (Step S305), and then, proceeds to Step S306. The details of the tier descent control information generation process will be described below with reference to FIG. 18. Note that during the tier descent control information generation process the service ID 601 and the file ID 604 of the entry which was selected in Step S303 will be inputted as information.

The control information generation part 121 makes a determination as to whether or not the process has been completed with respect to all the service servers 200 (Step S306).

In a case where it is determined that the process has not been completed with respect to all the service servers 200, the control information generation part 121 returns to Step S303 in order to execute the process therein.

In a case where it is determined that the process has been completed with respect to all the service servers 200, the control information generation part 121 selects an entry of the service server 200 to be processed from the service management information 131 (Step S307). To be more specific, the following process will be executed.

The control information generation part 121 refers to the service management information 131 in order to search for an entry whose status 608 indicates "currently executed." The control information generation part 121 selects an entry of the service server 200 to be processed from the entries retrieved from the search. At this point, the control information generation part 121 selects entries from a job net which includes the service whose status 608 indicates "currently executed" in accenting order according to the priority 607. In other words, the higher the priority of the entry of the service server 200 is, the sooner the entry will be selected.

The above is the description for the process in Step S307.

The control information generation part 121 makes a determination as to whether or not the cache hit ratio of the service server 200 to be processed is smaller than the lower limit (Step S308). To be more specific, the control information generation part 121 determines as to whether or not the value of the cache hit ratio 704 of the selected entry is smaller than the value of the lower limit 706.

In a case where it is determined that the cache hit ratio of the service server 200 to be processed is greater than the lower limit 706, the control information generation part 121 proceeds to Step S310.

In a case where it is determined that the cache hit ratio of the service server 200 to be processed is smaller than the lower limit 706, the control information generation part 121 executes a tier ascent control information generation process in order to change the storage location of the service data used by the service server 200 to be processed to a storage area at a higher tier (Step S309), and then, proceeds to Step S310. The details of the tier ascent control information generation process will be described below with reference to FIG. 19. Note that during the tier ascent control information generation process the service ID 601 and the file ID 604 of the entry which was selected in Step S307 will be inputted as information.

The control information generation part 121 makes a determination as to whether or not the process has been completed with respect to all the service servers 200 (Step S310).

In a case where it is determined that the process has not been completed with respect to all the service servers 200, the control information generation part 121 returns to Step S307 in order to execute the process therein.

In a case where it is determined that the process has been completed with respect to all the service servers 200, the control information generation part 121 transmits the control information which was generated during Step S305 and Step S309 to the service server. 200 to be processed (Step S311). Then, the control information generation part 121 ends the process. To be more specific, the following process will be executed.

The control information generation part 121 refers to an entry arranged at the top of the cache control information 1300 in order to extract all the entries which store therein the identifier identical to the service ID 1301 of the entry arranged at the top of the cache control information 1300. Further, the control information generation part 121 extracts from the tier control information 1310 all the entries in which the service ID 1311 matches the service ID 1301 of the referred entry.

The control information generation part 121 refers to the service management information 131 in order to search for the entry in which the service ID 601 matches the service ID 1301 of the referred entry. The control information generation part 121 identifies, based on the service server ID 602 of the entry retrieved from the search, the service server 200 to which transmission will be made.

The control information generation part 121 transmits the control information which includes the entry extracted from the cache control information 1300 and the entry extracted from the tier control information 1310 to the identified service server 200. Then, the control information generation part 121 deletes the entry, which was extracted from the cache control information 1300, from the cache control information 1300, and deletes the entry, which was extracted from the tier control information 1310, from the tier control information 1310.

The control information generation part 121 executes the above described process with respect to all the entries of the cache control information 1300. After executing the process with respect to the all entries of the cache control information 1300, the control information generation part 121 makes a determination as to whether or not an entry exists in the tier control information 1310.

In a case where there remains an entry in the tier control information 1310, the control information generation part 121 refers to the entry at the top of the tier control information 1310, and extracts all the entries which store the identifier identical to the service ID 1311 of the entry at the top of the tier control information 1310.

The control information generation part 121 refers to the service management information 131 in order to search for the entry in which the service ID 601 matches the service ID 1311 of the referred entry. The control information generation part 121 identifies, based on the service server ID 602 of the entry retrieved from the search, the service server 200 to which transmission will be made.

The control information generation part 121 transmits the control information which includes the entry extracted from the tier control information 1310 to the identified service server 200. Then, the control information generation part 121 deletes the entry, which was extracted from the tier control information 1310, from the tier control information 1310.

The control information generation part 121 executes the above described process with respect to all the entries of the tier control information 1310. After transmitting the control information, the control information generation part 121 updates the storage configuration management information 135.

The above is the description for the process in Step S311. Note that the above described transmission process of the control information is an example of such process, and the present invention is not limited thereto. For example, the transmission method may include reading out each entry from the cache control information 1300 and transmitting each read entry to the service server 200 in a sequential manner; and reading out each entry from the tier control information 1310 and transmitting each read entry to the service server 200 in a sequential manner.

Figure 18:
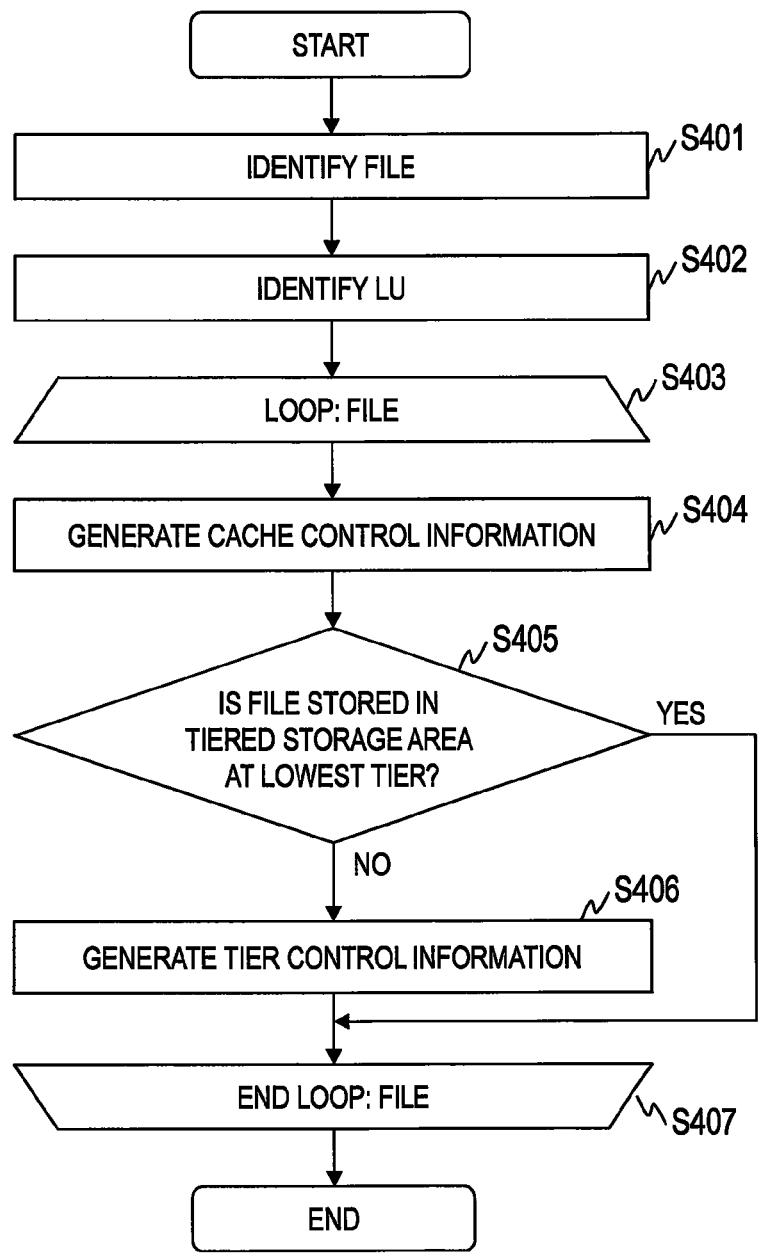
FIG. 18 is a flowchart illustrating an example of tier descent control information generation process according to the first embodiment.

FIG. 18 is a flowchart illustrating an example of the tier descent control information generation process according to the first embodiment.

The control information generation part 121 identifies the file used by the service to be processed (Step S401). To be more specific, the control information generation part 121 identifies, based on the file ID 604 of the entry selected during Step S303, the file which will be used by the service to be processed.

The control information generation part 121 identifies the LU in which the identified file is stored (Step S402). To be more specific, the following process will be executed.

The control information generation part 121 reads an identifier of the file stored in the file ID 604 of the entry selected during Step S303. Further, the control information generation part 121 refers to the file management information 134 in order to search for the entry in which the file ID 901 matches the identifier of the file which was read. In a case where the file ID 604 includes the identifiers of multiple files, the control information generation part 121 executes the above described process with respect to each identifier of the multiple files.

The control information generation part 121 refers to the storage configuration management information 135 in order to search for the entry in which the LDEV ID 1003 matches the LDEV ID 902 of the entry which was retrieved from the search. The control information generation part 121 identifies the LU in which the identified file is stored based on the LU ID 1001 of the entry retrieved from the search.

The above is the description for the process in Step S402.

Next, the control information generation part 121 selects a file to be processed from the files which were identified during Step S401 (Step S403). The control information generation part 121 generates the cache control information 1300 with respect to the file to be processed (Step S404). To be more specific, the following process will be executed.

The control information generation part 121 generates a command in order to discharge from the storage cache 320 the cache data of the file to be processed. The control information generation part 121 adds an entry to the cache control information 1300.

The control information generation part 121 sets the identifier of the service to be processed, the identifier of the file to be processed, "delete," and the generated command to the service IS 1301, the file ID 1302, the type 1303, and the command 1304 of the added entry, respectively.

The above is the description for the process in Step S404.

Next, the control information generation part 121 makes a determination as to whether or not the file to be processed is stored in the tiered storage area 330 at the lowest tier (Step S405). To be more specific, the following process will be executed.

The control information generation part 121 refers to the belonging LU ID 1102 of the tier management information 136 in order to identify the tier of the tiered storage area 330 to which the LU, storing therein the file to be processed, belongs. Further, the control information generation part 121 makes a determination as to whether or not the identified tier of the tiered storage area 330 is the lowest tier. According to the present embodiment, the determination will be made as to whether or not the tier ID 1101 indicates "T2."

The above is the description for the process in Step S405.

In a case where it is determined that the file to be processed is stored in the tiered storage area 330 at the lowest tier, the control information generation part 121 proceeds to Step S407. This is because, since the file to be processed is already stored in the tiered storage area 330 at the lowest tier, there is no need to change the storage location of the file.

In a case where it is determined that the file to be processed is not stored in the tiered storage area 330 at the lowest tier, the control information generation part 121 generates the tier control information 1310 (Step S406), and then, proceeds to Step S407. To be more specific, the following process will be executed.

The control information generation part 121 identifies the tier of the tiered storage area 330 to which the LU, storing therein the file to be processed, belongs. The method to identify the tier at this point may be the same as the identification method used during Step S405. The control information generation part 121 makes a determination as to whether or not any LU that belongs to the tiered storage area 330 at the lowest tier exists.

In a case where it is determined that an LU belonging to the tiered storage area 330 at the lowest tier exists, the control information generation part 121 generates a command in order to move the file from the LU in which the file to be processed is currently stored to the LU belonging to the tiered storage area 330 at the lowest tier.

In a case where it is determined that no LU belonging to the tiered storage area 330 at the lowest tier exists, the control information generation part 121 refers to the storage configuration management information 135 in order to search for LUs which are yet to be allocated. Further, the control information generation part 121 refers to the tier management information 136 in order to select an LU which belongs to the tiered storage area 330 at the lowest tier out of the LUs retrieved from the search.

According to the present embodiment the control information generation part 121 searches for an entry whose service server ID 1002 and LDEV ID 1003 or the like are blank. The control information generation part 121 searches for the entries of the LUs belonging to the tiered storage area 330 at the lowest tier by making a comparison between the belonging LU ID 1102 whose tier ID 1101 indicates "T2" with the LU ID 1001 of the entries retrieved from the search. Further, the control information generation part 121 selects an entry from the entries of the LU retrieved from the search.

The control information generation part 121 generates a command in order to move the file to be processed from the LU in which the file is currently stored to the selected LU. By this process, a new LU will be allocated to the LDEV.

The control information generation part 121 adds an entry to the tier control information 1310. The control information generation part 121 sets the identifier identical to the service ID 601, the identifier of the file to be processed, "DOWN," and the generated command to the service ID 1311 of the added entry, the file ID 1312, the type 1313, and the command 1314, respectively.

The above is the description for the process in Step S406.

The control information generation part 121 makes a determination as to whether or not the process has been completed with respect to all the files (Step S407).

In a case where it is determined that the process has not been completed with respect to all the files, the control information generation part 121 returns to Step S403 in order to execute the process therein. In a case where it is determined that the process has been completed with respect to all the files, the control information generation part 121 ends the process.

Note that the following process may be applied in a case where the tiered storage area 330 includes more than 3 tiers.

During Step S405 the control information generation part 121 refers to the tier management information 136 in order to search for the tiered storage area 330 arranged at a tier lower than the tiered storage area 330 to which the identified LU belongs.

During Step S406 the control information generation part 121 selects the tiered storage area 330 to which a transfer will be made out of the tiered storage areas 330 retrieved from the search. For example, the control information generation part 121 may select the tiered storage area 330 with the largest free capacity. The control information generation part 121 refers to the storage configuration management information 135 in order to select one LU, which is yet to be allocated, out of the LUs which belong to the selected tiered storage area 330. The control information generation part 121 generates a command in order to move the file to be processed from the LU in which the file is currently stored to the selected LU.

Figure 19:
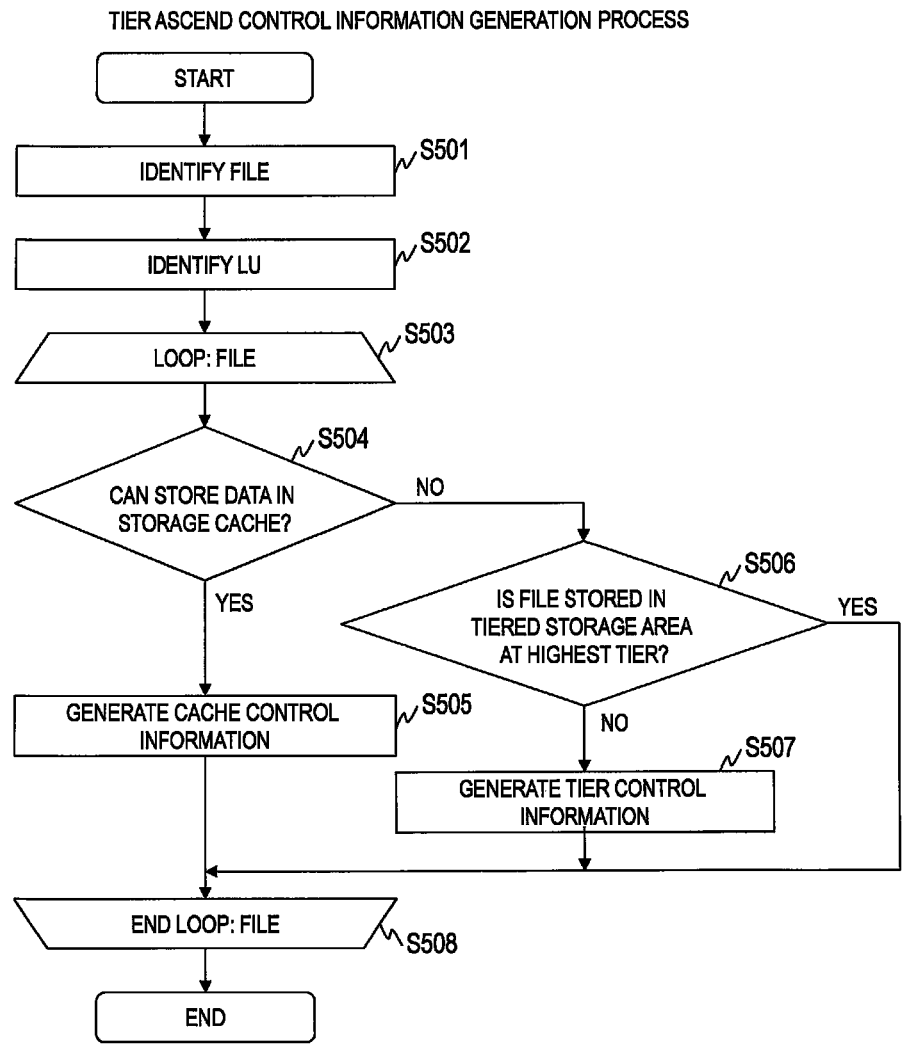
FIG. 19 is a flowchart illustrating an example of tier ascent control information generation process according to the first embodiment.

FIG. 19 is a flowchart illustrating an example of the tier ascent control information generation process according to the first embodiment.

The control information generation part 121 identifies the file used by the service to be processed (Step S501). The control information generation part 121 identifies the LU in which the identified file is stored (Step S502). Further, the control information generation part 121 selects a file to be processed out of the files identified during Step S501 (Step S503). Note that the processes carried out during Step S501 to Step S503 are the same as those carried out during Step S401 to Step S403.

The control information generation part 121 makes a determination as to whether or not the storage cache 320 is operable to store therein the cache data of the file to be processed (Step S504). To be more specific, the following process will be executed.

The control information generation part 121 refers to the storage cache management information 133 in order to calculate the free capacity of the storage cache 320 by subtracting the value of the usage 802 from the value of the cache capacity 801. Further, the control information generation part 121 refers to the data capacity 903 of the file management information 134 in order to obtain the data capacity of the file to be processed.

The control information generation part 121 makes a determination as to whether or not the free capacity of the storage cache 320 is greater than the data capacity of the file to be processed. In a case where the free capacity of the storage cache 320 is greater than the data capacity of the file to be processed, the control information generation part 121 determines that the storage cache 320 is operable to store therein the cache data of the file to be processed.

Note that the determination method described above is merely an example of such method, and that the preset invention is not limited thereto. For example, the control information generation part 121 may subtract the data capacity of the file to be processed from the free capacity of the storage cache 320 in order to make a determination as to whether or not the calculated difference is greater than a predetermined threshold. In a case where the calculated difference is greater than the threshold, the control information generation part 121 determines that the storage cache 320 is operable to store therein the file to be processed.

The above is the description for the process in Step S504.

In a case where it is determined that storage cache 320 is operable to store therein the file to be processed, the control information generation part 121 generates the cache control information (Step S505), and then, proceeds to Step S508. To be more specific, the following process will be executed.

The control information generation part 121 refers to the cache control information 1300 in order to search for an entry in which the file ID 1302 stores therein the identifier of the file to be processed and the type 1303 stores therein "delete." In a case where there is an entry which matches the above stated condition, the control information generation part 121 deletes such entry. This process is executed in order to prevent the conflicting processes of storing the cache data on the storage cache 320 and of driving the cache data out of the storage cache 320 from being executed.

The control information generation part 121 generates a command in order to store the cache data of the file to be processed in the storage cache 320. The control information generation part 121 adds an entry to the cache control information 1300. The control information generation part 121 sets the identifier identical to the service ID 601, the identifier of the file to be processed, "ADD," and the generated command to the service ID 1301 of the added entry, the file ID 1302, type 1303, and the command 1304, respectively.

The above is the description for the process in Step S505.

In a case where it is determined that the storage cache 320 is not operable to store therein the cache data of the file to be processed, the control information generation part 121 makes a determination as to whether or not the file to be processed is stored in the tiered storage area 330 at the lowest tier (Step S506). To be more specific, the following process will be executed. The control information generation part 121 refers to the belonging LU ID 1102 of the tier management information 136 in order to identify the tier of the tiered storage area 330 to which the LU, storing therein the file to be processed, belongs. Further, the control information generation part 121 makes a determination as to whether or not the identified tier of the tiered storage area 330 is the lowest tier. According to the present embodiment, the determination will be made as to whether or not the tier ID 1101 indicates "T1"

The above is the description for the process in Step S506.

In a case where it is determined that the file to be processed is stored in the tiered storage area 330 at the lowest tier, the control information generation part 121 proceeds to Step S508. This is because, since the file to be processed is already stored in the tiered storage area 330 at the lowest tier, there is no need to change the storage location of the file.

In a case where it is determined that the file to be processed is not stored in the tiered storage area 330 at the lowest tier, the control information generation part 121 generates the tier control information 1310 (Step S507), and then, proceeds to Step S508. To be more specific, the following process will be executed.

The control information generation part 121 refers to the tier control information 1310 in order to search for an entry in which the file ID 1312 stores therein the identifier of the file to be processed and the type 1313 stores therein "DOWN." In a case where there is an entry which matches the above stated condition, the control information generation part 121 deletes such entry. This process is executed in order to prevent the conflicting process of moving the file to the tiered storage area 330 at a lower tier and of moving the file to the tiered storage area 330 at a higher tier from being executed.

The control information generation part 121 identifies the tier of the tiered storage area 330 to which the LU, storing therein the file to be processed, belongs. The identification method may be the same as the method carried out during Step S405. The control information generation part 121 makes a determination as to whether or not any LU that belongs to the tiered storage area 330 at the highest tier exists.

In a case where it is determined that an LU belonging to the tiered storage area 330 at the highest tier exists, the control information generation part 121 generates a command in order to move the file to be processed from the LU in which the file is currently stored to the LU which belongs to the tiered storage area 330 at the highest tier.

In a case where it is determined that there is no LU which belongs to the tiered storage area 330 at the highest tier, the control information generation part 121 refers to the storage configuration management information 135 in order to search for an LU which is yet to be allocated. Further, the control information generation part 121 refers to the tier management information 136 in order to select an LU which belongs to the tiered storage area 330 at the highest tier from the LUs retrieved from the search.

The control information generation part 121 generates a command in order to move the file to be processed from the LU in which the file is currently stored to the selected LU. By this process, a new LU will be allocated to the LDEV The control information generation part 121 adds an entry to the tier control information 1310. The control information generation part 121 sets the identifier identical to the service ID 601, the identifier of the file to be processed, "UP," and the generated command to the service ID 1311 of the added entry, the file ID 1312, type 1313, and the command 1314, respectively.

The above is the description for the process in Step S507.

The control information generation part 121 makes a determination as to whether or not the process has been completed with respect to all the files (Step S508).

In a case where it is determined that the process has not been completed with respect to all the files, the control information generation part 121 returns to Step S503 in order to execute the process therein. In a case where it is determined that the process has been completed with respect to all the files, the control information generation part 121 ends the process.

Finally, a process which will be executed in a case where the storage server 300 receives the control information will be described.

Note that the following process may be applied in a case where the tiered storage area 330 includes more than 3 tiers.

During Step S506 the control information generation part 121 refers to the tier management information 136 in order to search the tiered storage area 330 arranged at a tier higher than the tiered storage area 330 to which the identified LU belongs.

During Step S507 the control information generation part 121 selects the tiered storage area 330 to which a transfer will be made out of the tiered storage areas 330 retrieved from the search. For example, the control information generation part 121 may select the tiered storage area 330 with the largest free capacity. The control information generation part 121 refers to the storage configuration management information 135 in order to select one LU, which is yet to be allocated, out of the LUs which belong to the selected tiered storage area 330. The control information generation part 121 generates a command in order to move the file to be processed from the LU in which the file is currently stored to the selected LU.

Figure 20A:
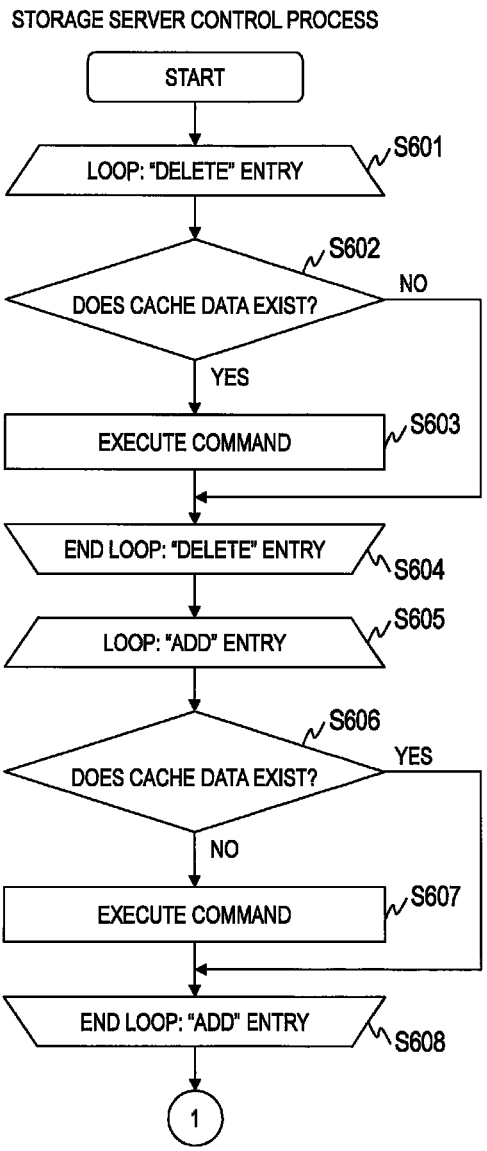
FIG. 20A and FIG. 20B are flowcharts each illustrating process the storage server executes in a case where the storage server receives control information according to the first embodiment.
Figure 20B:
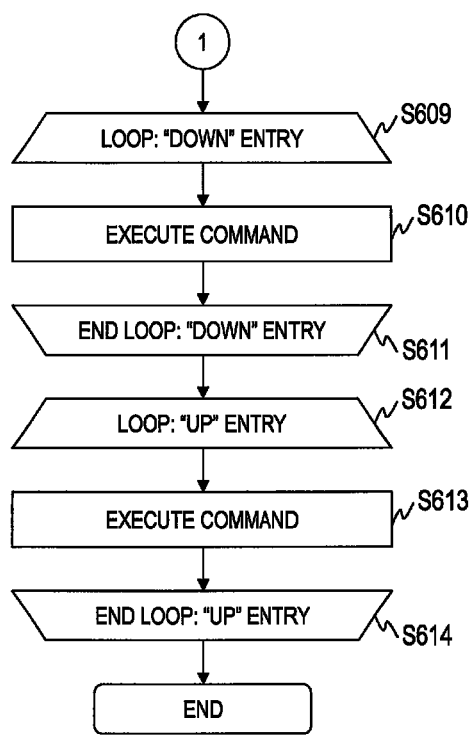

FIG. 20A and FIG. 20B are flowcharts each illustrating the process the storage server 300 executes in a case where the storage server 300 receives control information according to the first embodiment.

In a case where the storage area management OS 310 receives control information from the management server 100 (Step S105), the storage area management OS 310 selects an entry whose type 1303 indicates "delete" out of the entries of the cache control information 1300 included in the control information (Step S601). Here, the storage area management OS 310 selects entries in an order from the top.

In a case where the control information does not include the entry of the cache control information 1300, the storage area management OS 310 omits the processes corresponding to Step S601 through Step S608, and starts with Step S609.

The storage area management OS 310 makes a determination as to whether or not the cache data of the file to be deleted exists in the storage cache 320 based on the file ID 1302 and the command 1304 of the selected entry (Step S602). During Step S602, a conventional technique to determine the cache hit may be applied.

In a case where it is determined that the cache data of the file to be deleted does not exist in the storage cache 320, the storage area management OS 310 deletes the entry selected from the cache control information 1300 included in the control information, and then, proceeds to Step S604. This is because, since the storage cache 320 does not include the cache data to be processed, there is no need to execute the command 1304.

In a case where it is determined that the cache data of the file to be deleted exists in the storage cache 320, the storage area management OS 310 executes the command 1304 of the selected entry (Step S603), and then, proceeds to Step S604. By this, the cache data of the file to be deleted will be driven out of the storage cache 320. The storage area management OS 310 deletes the entry selected from the cache control information 1300 included in the control information after executing the command 1304.

The storage area management OS 310 makes a determination as to whether or not the process has been completed with respect to all the entries whose type 1303 indicate "delete" out of the entries of the cache control information 1300 included in the control information (Step S604).

In a case where it is determined that the process has not been completed with respect to all the entries whose type 1303 indicate "delete," the storage area management OS 310 returns to Step S601 in order to execute the process therein.

In a case where it is determined that the process has been completed with respect to all the entries whose type 1303 indicate "delete," the storage area management OS 310 selects an entry whose type 1303 indicates "add" out of the entries of the cache control information 1300 included in the control information (Step S605). Here, the storage area management OS 310 selects entries in an order from the top.

The storage area management OS 310 makes a determination as to whether or not the cache data of the file to be added exists in the storage cache 320 based on the file ID 1302 and the command 1304 of the selected entry (Step S606). During Step S606, a convention technique to determine the cache hit may be applied.

In a case where it is determined that the cache data of the file to be added exists in the storage cache 320, the storage area management OS 310 deletes the entry selected from the cache control information 1300 included in the control information, and then, proceeds to Step S608. This is because, since the cache data to be processed exists in the storage cache 320, there is no need to execute the process corresponding to the command 1304.

In a case where it is determined that the cache data of the file to be added does not exist in the storage cache 320, the storage area management OS 310 executes the command 1304 of the selected entry (Step S607), and then, proceeds to Step S608. By this, the cache data of the file to be added is stored in the storage cache 320. The storage area management OS 310 deletes the entry selected from the cache control information 1300 included in the control information after executing the command 1304.

The storage area management OS 310 makes a determination as to whether or not the process has been completed with respect to all the entries whose type 1303 indicate "add" out of the entries of the cache control information 1300 included in the control information (Step S608). In a case where it is determined that the process has not been completed with respect to all the entries whose type 1303 indicate "add," the storage area management OS 310 returns to Step S605 in order to execute the process therein.

In a case where it is determined that the process has been completed with respect to all the entries whose type 1303 indicate "add," the storage area management OS 310 selects an entry whose type 1313 indicates "DOWN" out of the entries of the tier control information 1310 included in the control information (Step S609). Here, the storage area management OS 310 selects entries in an order from the top.

The storage area management OS 310 executes the command 1314 of the selected entry (Step S610). During Step S610, a conventional technique of the tier control process of the storage system may be applied. The storage area management OS 310 deletes the entry selected from the tier control information 1310 after executing the command 1314.

The storage area management OS 310 makes a determination as to whether or not the process has been completed with respect to all the entries whose type 1313 indicate "DOWN" out of the tier control information 1310 included in the control information (Step S611). In a case where it is determined that the process has not been completed with respect to all the entries whose type 1313 indicate "DOWN," the storage area management OS 310 returns to Step S609 in order to execute the process therein.

In a case where it is determined that the process has been completed with respect to all the entries whose type 1313 indicate "DOWN," the storage area management OS 310 selects an entry whose type 1313 indicates "UP" out of the entries of the tier control information 1310 included in the control information (Step S612). Here, the storage area management OS 310 selects entries in an order from the top.

The storage area management OS 310 executes the command 1314 of the selected entry (Step S613). During Step S613, a conventional technique of the tier control process of the storage system may be applied. The storage area management OS 310 deletes the entry selected from the tier control information 1310 after executing the command 1314.

The storage area management OS 310 makes a determination as to whether or not the process has been completed with respect to all the entries whose type 1313 indicate "UP" out of the tier control information 1310 included in the control information (Step S614). In a case where it is determined that the process has not been completed with respect to all the entries whose type 1313 indicate "UP," the storage area management OS 310 returns to Step S612 in order to execute the process therein.

In a case where it is determined that the process has been completed with respect to all the entries whose type 1313 indicate "UP," the storage area management OS 310 ends the process.

According to the first embodiment the management server 100 is operable to link with the cache driver 213 of the service server 200 and optimize the storage locations of files based on the cache hit ratio of the server cache 230.

To be more specific, the service data of the service server 200 whose cache hit ratio is high will be stored at the lower tiered storage area of the storage server 300 while the service data of the service server 200 whose cache hit ratio is low will be stored at a higher tiered storage area of the storage server 300.

In a case where the cache hit ratio is high, the frequency of access from the service server 200 to the storage server 300 will be lowered, while when the cache hit ratio is low, the frequency of access from the service server 200 to the storage server 300 will be increased. Accordingly, by storing the service data of the service server whose cache hit ratio is low at the higher tiered storage area of the storage server 300, the processing capability of the application 220 running at the service server 200 will be improved. Also, the processing capability of the application 220 is further improved since the cache optimization part 110 controls the storage cache 320 simultaneously as the tier changing process.

Further, since the cache optimization part 110 changes the storage location of files in an automatic and dynamic manner in accordance with control policies, the management cost of the computer system will be reduced.

(Modification 1)

As illustrated in FIG. 17, according to embodiment, after generating control information for each file, the control information generation part 121 of the cache optimization part 110 transmits the control information to each service server 200 during the storage location change process (Step S311).

According to modification 1, the control information generation part 121 transmits the control information to each service server 200 after executing the descent tier control information generation process. Also, the control information generation part 121 transmits the control information to each service server 200 after executing the tier ascent control information generation process.

The control information generation part 121 is operable to secure a usable storage area by transmitting descent tier control information to each service server 200 prior to executing the tier ascent control information generation process. Accordingly, it becomes possible to store files at more appropriate storage locations according to modification 1.

(Modification 2)

According to modification 2, the cache optimization part 110 obtains from the storage area management OS 310 the management information of the storage cache 320 in advance. By this, the cache optimization part 110 is operable to comprehend the cache data stored in the storage cache 320. Note that the details of the management information concerning the storage cache 320 will be omitted since it is well known in the art.

In this case, the contents of the tier descent control information generation process and the tier ascent control information generation process are partially different from one another.

First, modified aspects of the tier descent control information generation process will be described.

After selecting a file to be processed (Step S403), the control information generation part 121 refers to the management information of the storage cache 320 in order to make a determination as to whether or not the storage cache 320 stores therein the cache data of the file to be processed.

In a case where it is determined that the storage cache 320 does not store therein the cache data of the file to be processed, the control information generation part 121 proceeds to Step S405. On the other hand, in a case where it is determined that the storage cache 320 stores therein the cache data of the file to be processed, the control information generation part 121 proceeds to Step S404.

In this case, the storage server 300 is operable to omit the determination process of Step S602.

Next, modified aspects of the tier ascent control information generation process will be described.

After selecting a file to be processed (Step S503), the control information generation part 121 refers to the storage cache 320 in order to make a determination as to whether or not the storage cache 320 stores therein the cache data of the file to be processed.

In a case where it is determined that the storage cache 320 stores therein the cache data of the file to be processed, the control information generation part 121 proceeds to Step S508. On the other hand, in a case where it is determined that the storage cache 320 does not store therein the cache data of the file to be processed, the control information generation part 121 proceeds to Step S504.

In this case, the storage server 300 is operable to omit the determination process of Step S606.

According to modification 2, it becomes possible to reduce the processing load on the storage server 300 accompanying the storage location change process. Accordingly, it becomes possible to improve the performance of the application 220.

Second Embodiment

According to second embodiment, the management server 100 generates control information in advance based on the service schedule of each service server 200. In a case where the management server 100 receives a service start notification or a service end notification from the cache driver 213, the management server 100 controls the storage location of the service data in the storage server 300 based on such control information.

Hereinafter, the second embodiment will be described focusing on differences between the first embodiment and the second embodiment. It is to be noted that service data according to the second embodiment includes data in a file format as in the first embodiment.

Note that the hardware configurations and the software configurations of the management server 100, the service server 200, and the storage server 300 according to the second embodiment are the same as those according to the first embodiment, and thus the detailed description thereof will be omitted. Also, the service management information 131, the server cache management information 132, the storage cache management information 133, the file management information 134, the storage configuration management information 135, the tier management information 136, and the control policy information 137 according to the second embodiment are the same as those according to the first embodiment, and thus the detailed description thereof will be omitted.

Note that the control management information 138 and the alert setting information 215 according to the second embodiment are different from those according to the first embodiment.

FIG. 21 is an explanatory diagram illustrating an example of the control management information 138 according to the second embodiment.

The cache control information 1300 according to the second embodiment is the same as that according to the first embodiment. The tier control information 1310 according to the second embodiment is different from that according to the first embodiment in that an alert 2101 is newly added thereto.

The alert 2101 includes the contents of an alert notified from the service server 200. According to the present embodiment, the alert 2101 stores therein the identifier of a file indicating a start trigger of service or an end trigger of service and the address of the file on the LDEV.

Figure 22:
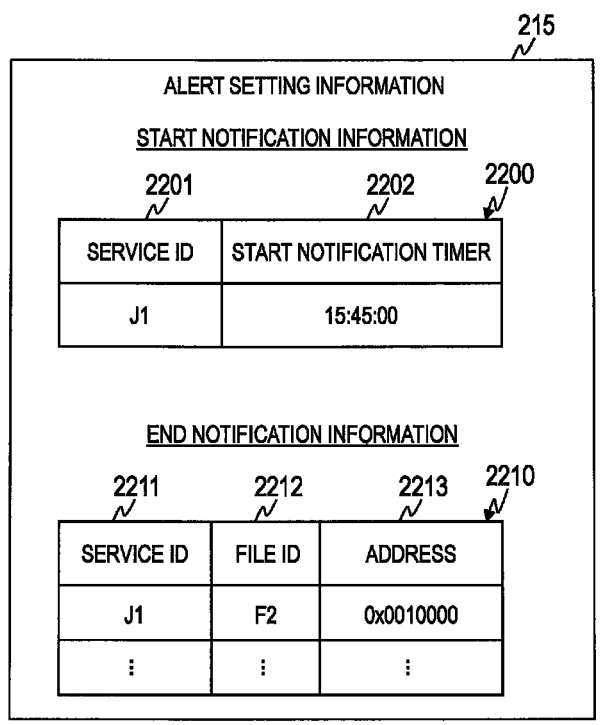
FIG. 22 is an explanatory diagram illustrating an example of the alert setting information according to the second embodiment.

FIG. 22 is an explanatory diagram illustrating an example of the alert setting information 215 according to the second embodiment.

The alert setting information 215 according to the second embodiment includes start notification information 2200 and end notification information 2210.

The start notification information 2200 is a piece of information used to notify the start of a first service of a job net. To be more specific, the start notification information 2200 includes a service ID 2201 and a start notification timer 2202.

The service ID 2201 is an identifier of the service to be started, and is the same as the service ID 601. The start notification timer 2202 is a timer configured to transmit the alert information notifying the start of the service. The service server 200 notifies the start of a service to be executed firstly in a job net in accordance with the start notification information 2200.

The end notification information 2210 is a piece of information used to notify the end of a service which is being executed. To be more specific, the end notification information 2210 includes a service ID 2211, a file ID 2212, and an address 2213.

The service ID 2211 is an identifier configured to identify a service, and is the same as the service ID 601. The file ID 2212 is an identifier configured to identify a file, and is the same as the file ID 604. The address 2213 is a specific address of a file corresponding to the file ID 2212. The address refers to an address of the LDEV.

Next, processes executed according to the second embodiment will be described.

Figure 23:
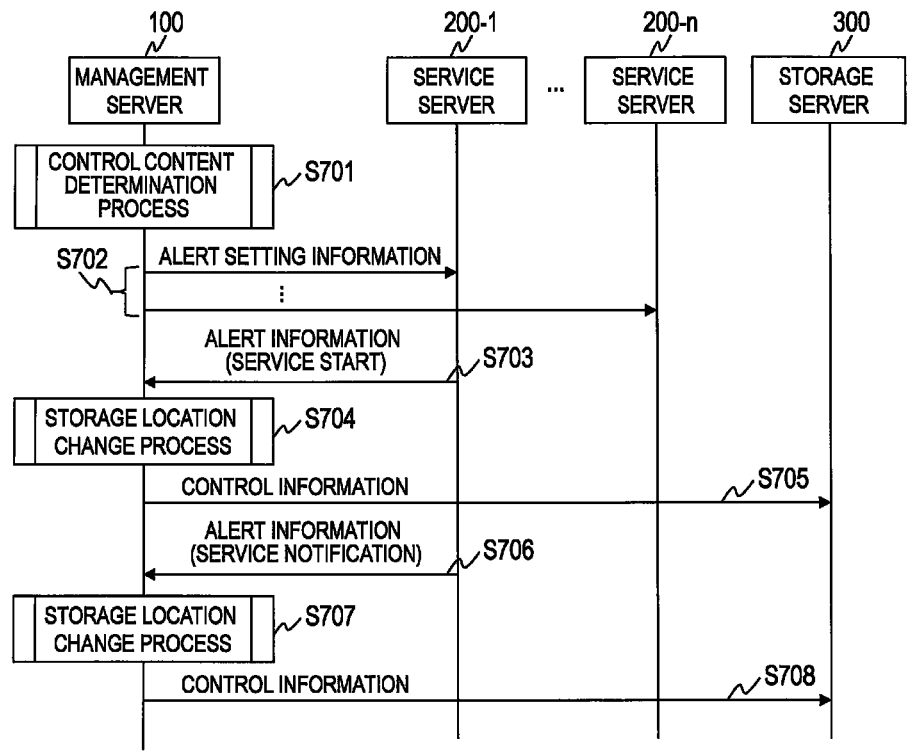
FIG. 23 is a sequence diagram illustrating a flow of processes according to the second embodiment.

FIG. 23 is a sequence diagram illustrating a flow of processes according to the second embodiment.

First, the management server 100 executes the control content determination process in order to determine control contents (Step S701). The details of the control content determination process will be described below with reference to FIG. 24. According to the present embodiment, "batch job" is designated as a control condition by an administrator or the like.

Note that the control content determination process is executed before the operation of the computer system starts.

The management server 100 transmits the alert setting information 215 which has been generated to the plurality of service servers 200 (Step S702). The management server 100 transmits the alert setting information 215 to each service server 200 via multicast transmission. Note if the current process is executed in response to a new service server 200 being added to the system, the management server 100 transmits the alert setting information 215 only to that service server 200.

Each service server 200 stores the received alert setting information 215 in the memory 202. According to the present embodiment, the alert setting information 215 as illustrated in FIG. 22 is stored in the memory 202.

The cache driver 213 of each service server 200 detects the start of a service based on the alert setting information 215, and transmits the alert information notifying the start of the service to the management server 100 (Step S703). Further, each service server 200 detects the end of the service based on the alert setting information 215, and transmits the alert information notifying the end of the service to the management server 100 (Step S706).

The management server 100 executes the storage location change process based on the received alert information (Step S704, Step S707). Further, the management server 100 transmits control information to the storage server 300 based on the result of the execution of the storage location change process (Step S705, Step S708). The details of the storage location change process will be described below with reference to FIG. 25A, FIG. 25B, and FIG. 25C.

Figure 24:
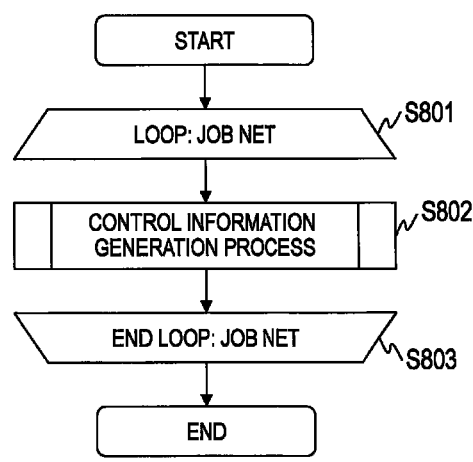
FIG. 24 is a flowchart illustrating an example of the control content determination process according to the second embodiment.

FIG. 24 is a flowchart illustrating an example of the control content determination process according to the second embodiment.

The cache optimization part 110 calls the control information generation part 121. The control information generation part 121 which received the call selects a job net to be processed (Step S801). To be more specific, the control information generation part 121 analyzes the service management information 131 in order to identify at least one job net and select a job net to be processed out of the identified job nets. Note that the job nets are selected in an ascending order according to the value of the priority 607. In other words, the higher the priority of the job net is, the sooner the job net will be selected.

Note the following methods may be applied to identify job nets. The control information generation part 121 selects an entry in which the related service ID 606 is blank out of entries that have been extracted. The control information generation part 121 searches for an entry in which the related service ID 606 matches the service ID 601 of the selected entry. The control information generation part 121 repeats the above stated process in order to identify all the services included in one job net. Further, the control information generation part 121 is operable to identify all job nets by executing the above described process with respect to all the entries in which the related service ID 606 are blank.

The control information generation part 121 executes the control information generation process in order to control the storage location of the service data, used by the service server 200, included in the selected job net (S802). The details of the control information generation process will be described below with reference to FIG. 25A, FIG. 25B, and FIG. 25C.

The control information generation part 121 makes a determination as to whether or not the process has been completed with respect to all the job nets (Step S803).

In a case where it is determined that the process has not been completed with respect to all the job nets, the control information generation part 121 returns to Step S801 in order to execute the process therein.

In a case where it is determined that the process has been completed with respect to all the job nets, the cache optimization part 110 ends the process.

Figure 25A:
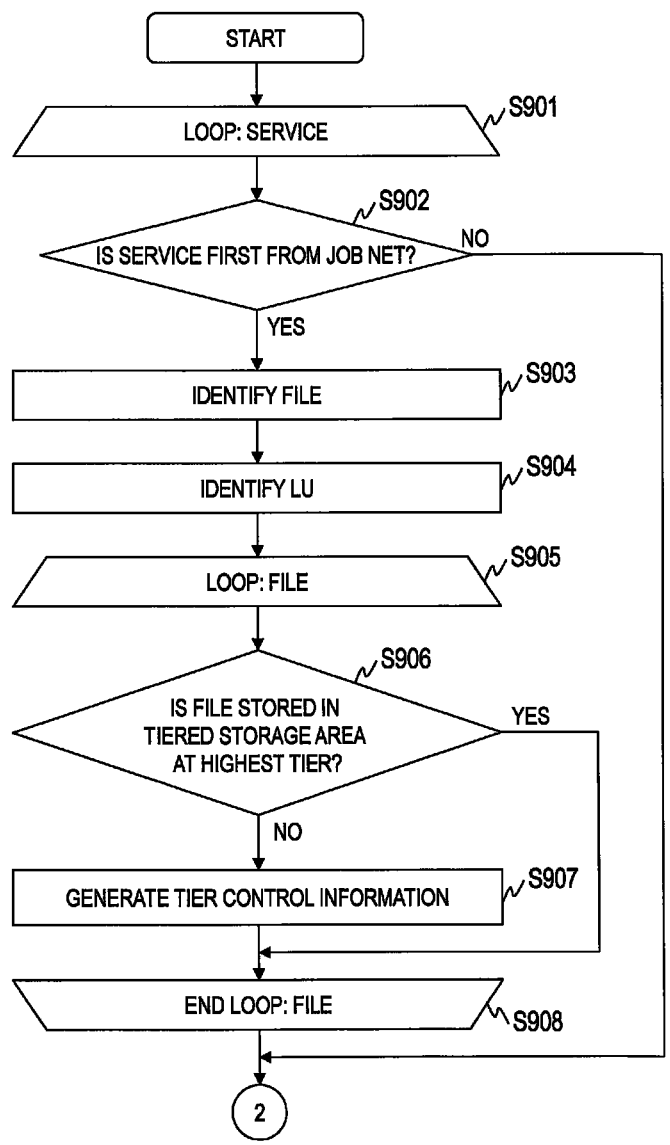
FIG. 25A, FIG. 25B, and FIG. 25C are flowcharts each illustrating an example of the control information generation process according to the second embodiment.
Figure 25B:
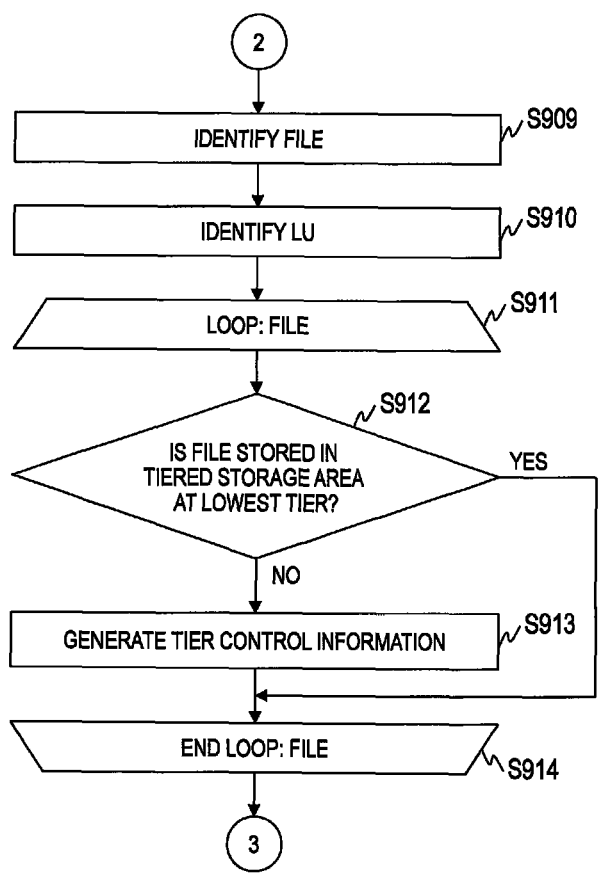
Figure 25C:
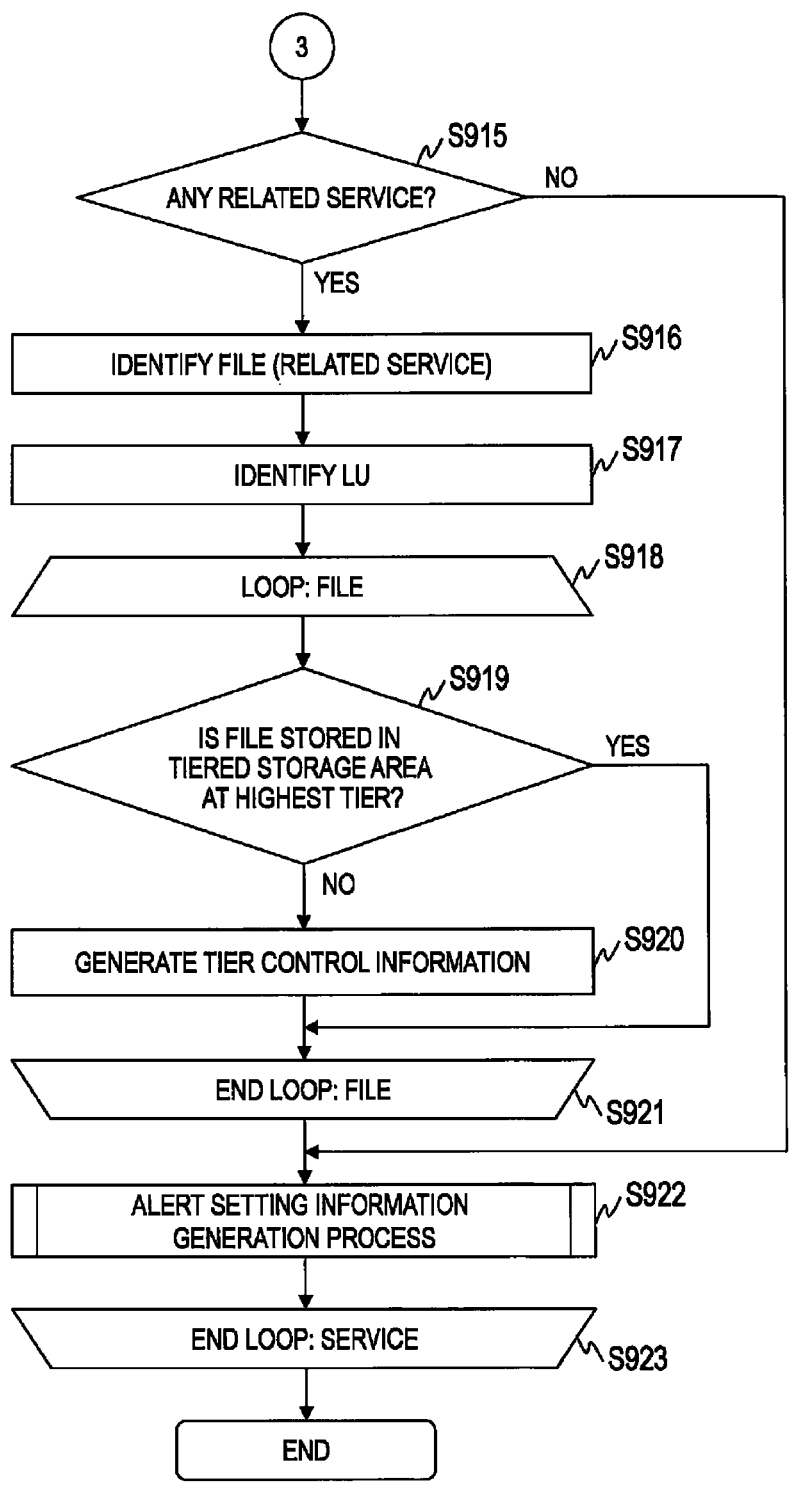

FIG. 25A, FIG. 25B, and FIG. 25C are flowcharts each illustrating an example of the control information generation process according to the second embodiment.

Next, the control information generation part 121 selects a service to be processed out of a job net to be processed (Step S901). To be more specific, the control information generation part 121 selects services in accordance with an order of execution of services of the job net.

The control information generation part 121 makes a determination as to whether or not the service to be processed is the first service to be processed out of a job net (Step S902). In a case where it is determined that the service to be processed is not the first service to be processed from the job net, the control information generation part 121 proceeds to Step S909.

In a case where it is determined that the service to be processed is the first service to be processed from the job net, the control information generation part 121 identifies a file used by the service to be processed (Step S903), and further, identifies the LU storing therein the identified file (Step S904). Note that the processes carried out during Step S903 and Step S904 are same as those carried out during Step S401 and S402.

The control information generation part 121 selects a file to be processed from the files identified during Step S903 (Step 905). The control information generation part 121 makes a determination as to whether or not the file to be processed is stored in the tiered storage area 330 at the highest tier (Step S906). The process carried out during Step S906 is the same as the process carried out during Step S506.

Note that the process of Step S906 may be omitted. In a case where the process of Step S906 is omitted, the storage server 300 makes a determination as to whether or not the file to be processed is stored in the tiered storage area 330 at the highest tier after receiving the control information including the tier control information 1310. In a case where it is determined that the file to be processed is stored in the tiered storage area 330 at the highest tier, the storage server 300 executes the process in accordance with the tier control information 1310 included in the control information.

In a case where it is determined that the file to be processed is stored in the tiered storage area 330 at the highest tier, the control information generation part 121 proceeds to Step S908. This is because, since the file to be processed is already stored in the tiered storage area 330 at the highest tier, there is no need to change the storage location for the file.

In a case where it is determined that the file to be processed is not stored in the tiered storage area 330 at the highest tier, the control information generation part 121 generates the tier control information 1310 (Step S907), and then proceeds to Step S908. Note that while the process carried out during S907 is substantially the same as the process carried out during Step S507, the tier control information 1310 generated during Step S507 is set to include information different from the information included in the tier control information 1310 generated during Step S907.

The control information generation part 121 adds an entry to the tier control information 1310 after generating a command. The control information generation part 121 sets the identifier of the service to be processed and "TIMER" to the service ID 1311 of the added entry and the alert 2101. Further, the control information generation part 121 sets the identifier of the file to be processed which was selected during Step S905, "UP," and the generated command to the file ID 1312 of the added entry, the type 1313, and the command 1314, respectively.

The above is the description for the process in Step S907.

The control information generation part 121 makes a determination as to whether or not the process has been completed with respect to all the files (S908). In a case where it is determined that the process has not been completed with respect to all the files, the control information generation part 121 returns to Step S905 in order to execute the process therein.

The control information generation part 121 identifies a file used by the service to be processed which was selected during Step S901 (Step S909), and further, identifies the LU which stores therein the identified file (Step S910). Note the processes carried out during Step S909 and Step S910 are the same as the processes carried out during Step S401 and Step S402. Also note that in a case where the service to be processed is the first service to be processed from the job net, the processes of Step S909 and Step S910 are carried out in Step S903 and Step S904. Accordingly, in a case where the service to be processed is the first service to be processed from the job net, the processes of Step S909 and Step S910 can be omitted.

The control information generation part 121 selects a file to be processed out of the identified files (Step S911). The control information generation part 121 makes a determination as to whether or not the file to be processed is stored in the tiered storage area 330 at the lowest tier (Step S912). The process carried out during Step S912 is the same as the process carried out during S405.

In a case where it is determined that the file to be processed is stored in the tiered storage area 330 at the lowest tier, the control information generation part 121 proceeds to Step S914. This is because the storage location of the file to be processed does not need to be changed.

In a case where it is determined that the file to be processed is not stored in the tiered storage area 330 at the lowest tier, the control information generation part 121 generates the tier control information 1310 (Step S913), and then proceeds to Step S914. The process carried out during Step S913 is substantially the same as the process carried out during Step S406 except for a partial difference there between. To be more specific, the following process will be executed.

The control information generation part 121 determines an address of a file in order to detect the end of the service to be processed after generating a command. The control information generation part 121 adds an entry to the tier control information 1310.

The control information generation part 121 sets the identifier of the service to be processed which was selected during Step S902 to the service ID 1311 of the added entry, and the identifier and the address of the file determined during Step S913 to the alert 2101. Also, the control information generation part 121 sets the identifier of the file to be processed, "DOWN," and the generated command to the file ID 1312 of the added entry, the type 1313, and the command 1314, respectively.

Note the following methods may be applied to determine the file address. First, the service server 200 executes the service to be processed in advance. At this point, the control information generation part 121 obtains information related to access identification from the cache driver 213. The control information generation part 121 analyzes the obtained information related to access identification, determines the address for detecting the end of the file to be processed, and accumulates the address as history information. The control information generation part 121 determines the address for determining the end of the file to be processed based on the history information. Note that the above described method for determining addresses is merely an example and the present invention is not limited thereto.

The above is the description for the process in Step S913.

The control information generation part 121 makes a determination as to whether or not the process has been completed with respect to all the files (Step S914). In a case where it is determined that the process has not been completed with respect to all the files, the control information generation part 121 returns to Step S911 in order to executed the process therein.

In a case where it is determined that the process has been completed with respect to all the files, the control information generation part 121 makes a determination as to whether or not a related service, which will be executed after the execution of the service to be processed, exists (Step S915). To be more specific, the control information generation part 121 makes a determination as to whether or not the related service ID 606 of the entry corresponding to the service to be processed stores therein an identifier of another service.

In a case where it is determined that a related service, which will be executed after the execution of the service to be processed, does not exist, the control information generation part 121 proceeds to Step S922.

In a case where it is determined that a related service, which will be executed after the execution of the service to be processed, exists, the control information generation part 121 identifies a file which will be used by the related service (Step S916), and then identifies the LU storing therein the identified file (Step S917). The processed carried out during Step S916 and Step S917 are the same as the processes carried out during Step S401 and Step S402.

The control information generation part 121 selects a file to be processed from the files identified during Step S916 (Step S918). The control information generation part 121 makes a determination as to whether or not the file to be processed is stored in the tiered storage area 330 at the highest tier (Step S919). The process carried out during Step S919 is the same process carried out during Step S506.

In a case where it is determined that the file to be processed is stored in the tiered storage area 330 at the highest tier, the control information generation part 121 proceeds to Step S921. This is because, since the file to be processed is already stored in the tiered storage area 330 at the highest tier, there is no need to change the storage location of the file.

In a case where it is determined that the file to be processed is not stored in the tiered storage area 330 at the highest tier, the control information generation part 121 generates the tier control information 1310 (Step S920), and then, proceeds to Step S921. Note that while the process carried out during Step S920 is substantially the same as the process carried out during Step S404, the tier control information 1310 generated during Step S920 is set to include information different from the information included in the tier control information 1310 generated during Step S406.

The control information generation part 121 adds an entry to the tier control information 1310 after generating a command.

The control information generation part 121 sets the identifier of the related service to the service ID 1311 of the added entry, and the identifier and the address of the file determined during Step S913 to the alert 2101. Also, the control information generation part 121 sets the identifier of the file to be processed which was selected during Step S918, "UP," and the generated command to the file ID 1312 of the added entry, the type 1313, and the command 1314.

The above is the description for the process in Step S920.

The control information generation part 121 makes a determination as to whether or not the process has been completed with respect to all the files (Step S921). In a case where it is determined that the process has not been completed with respect to all the file, the control information generation part 121 returns to Step S918 in order to execute the process therein.

In a case where it is determined that the process has been completed with respect to all the file, the cache optimization part 110 calls the alert setting information generation part 122, instructs the alert setting information generation part 122 to execute an alert setting information generation process (Step S922), and then, proceeds to Step S923. The details of the alert setting information generation process will be described below with reference to FIG. 26. The control information generation part 121 remains in a standby mode until it receives a notification notifying the completion of the process from the alert setting information generation part 122.

The control information generation part 121 makes a determination as to whether or not the process has been completed with respect to all the services included in the job net after receiving the notification notifying the completion of the process from the alert setting information generation part 122 (Step S923). In a case where it is determined that the process has not been completed with respect to all the services included in the job net, the control information generation part 121 returns to Step S901 in order to execute the process therein.

Figure 26:
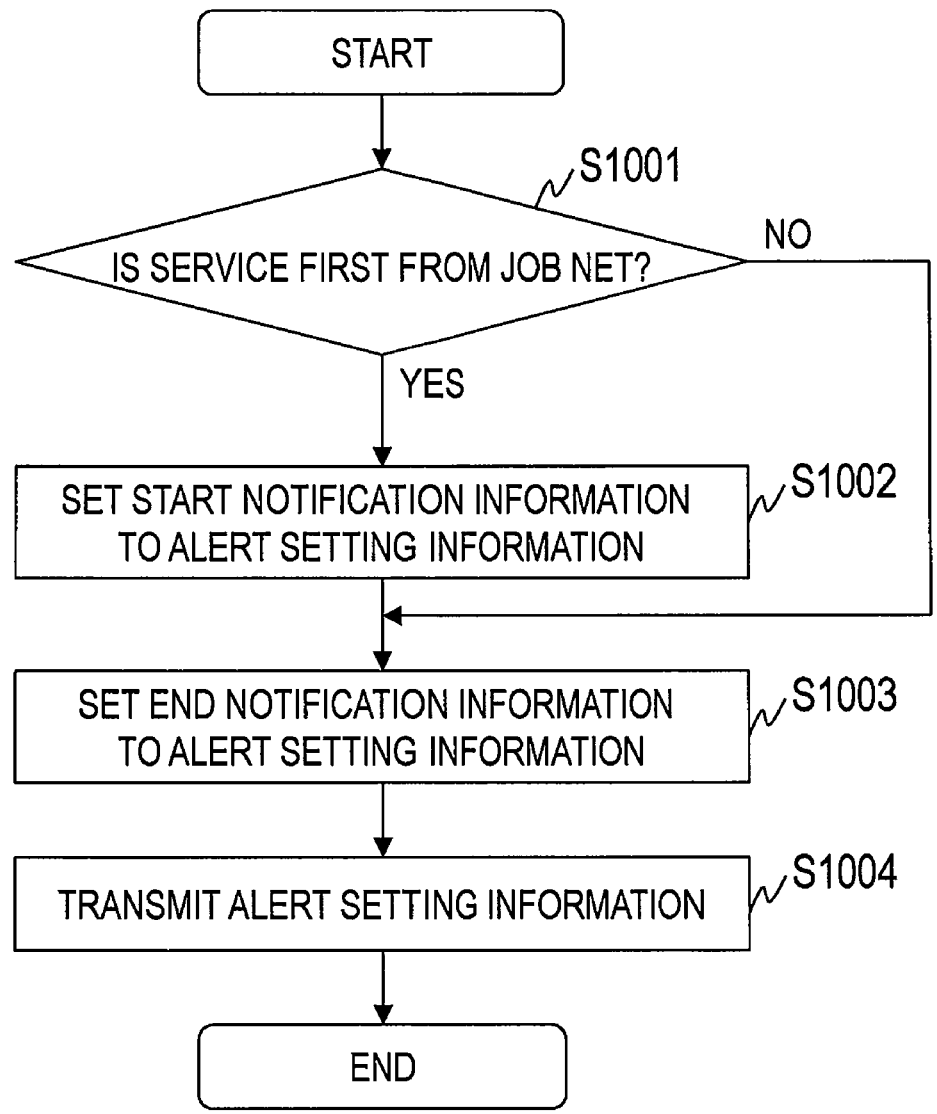
FIG. 26 is a flowchart illustrating an example of alert setting information generation process according to the second embodiment.

FIG. 26 is a flowchart illustrating an example of the alert setting information generation process according to the second embodiment.

The alert setting information generation part 122 makes a determination as to whether or not the service to be processed is to first service to be processed from a job net (Step S1001). In a case where it is determined that the service to be processed is not the first service to be processed from the job net, the alert setting information generation part 122 proceeds to Step S1003.

In a case where it is determined that the service to be processed is the first service to be processed from a job net, the alert setting information generation part 122 generates the alert setting information 215, and sets the start notification information 2200 to the generated alert setting information 215 (Step S1002). To be more specific, the following process will be executed.

The alert setting information generation part 122 refers to the schedule 605 of the service management information 131 in order to determine a time in which the alert information, which notifies the start of the service, is transmitted. Note that in the description herein 15 minutes prior to the start of the service, which is the first service to be processed from the job net, is the time when the alert information is transmitted. However, the present invention is not limited to the method for determining the time.

The alert setting information generation part 122 sets the identifier of the service to be processed which was selected during Step S901 to the service ID 2201 of the start notification information 2200, and sets the time which was determined to the start notification timer 2202.

The above is the description for the process in Step S1002.

The alert setting information generation part 122 sets the end notification information 2210 to the alert setting information 215 (Step S1003), and transmits the generated alert setting information 215 to the service server 200 (Step S1004). The alert setting information generation part 122 ends the process after notifying the completion of the process to the control information generation part 121. To be more specific, the following process will be executed.

The alert setting information generation part 122 refers to the tier control information 1310 in order to search for an entry in which the service ID 1311 matches the identifier of the service to be processed which was selected during Step S901. The alert setting information generation part 122 adds an entry to the end notification information 2210.

The alert setting information generation part 122 sets the information of the entry retrieved from the search in the tier control information 1310 to the entry added to the end notification information 2210. To be more specific, the alert setting information generation part 122 sets the identifier of the service selected during Step S901 to the service ID 2211, sets the identifier of the file stored in the file ID 1312 to the file ID 2212, and sets the address which will be stored in the alert 2101 to the address 2213.

The alert setting information generation part 122 refers to the service management information 131 in order to search for an entry in which the service ID 601 matches the identifier of the service to be processed. The alert setting information generation part 122 identifies the service server 200 to which the alert setting information 215 will be sent based on the service server ID 602 retrieved from the search. Further, the alert setting information generation part 122 transmits the alert setting information 215 to the identified service server 200.

The above is the processes in Step S1003 and Step S1004.

Note that in a case where the service server 200 receives the alert setting information 215, the following process will be executed. In a case where the service server 200 receives the alert setting information 215 from the management server 100, the OS 210 of the service server 200 makes a determination as to whether or not another alert setting information 215 already exists. In a case where it is determined that the alert setting information 215 already exists, the OS 210 merges the new alert setting information 215 with the existing alert setting information 215.

Further, the service server 200 transmits alert information to the management server 100 in accordance with the following process.

In a case where the time set in the start notification timer 2202 of the start notification information 2200 passes, the cache driver 213 transmits alert information including the service ID 2201 to the management server 100. Then, the cache driver 213 monitors access requests from the application 220 based on the alert setting information 215.

The cache driver 213 transmits the service ID 2211, the file ID 2212, and the address 2213 to the management server 100 when the end of service is detected.

Figure 27A:
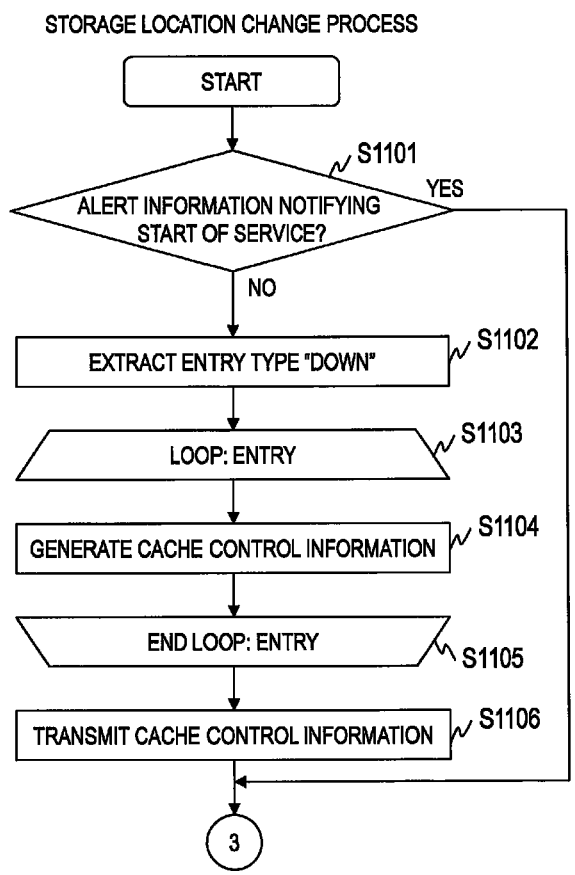
FIG. 27A and FIG. 27B are flowcharts each illustrating an example of the storage location change process according to the second embodiment.
Figure 27B:
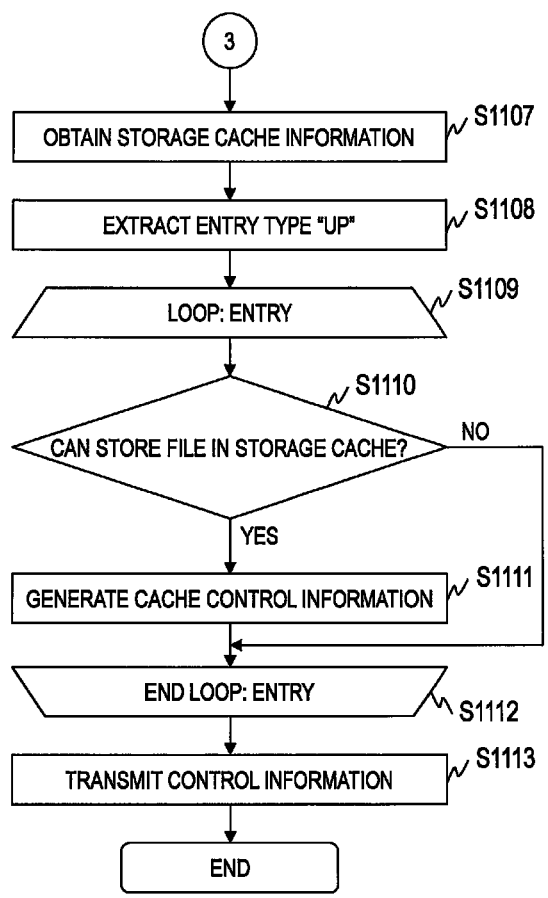

FIG. 27A and FIG. 27B are flowcharts each illustrating an example of the storage location change process according to the second embodiment.

Upon receiving alert information, the cache optimization part 110 calls the control information generation part 121. The control information generation part 121 which received the call makes a determination as to whether or not the alert information received from the service server 200 notifies the start of a service (Step S1101). In a case where it is determined that the alert information received from the service server 200 notifies the start of a service, the control information generation part 121 proceeds to Step S1107.

On the other hand, in a case where it is determined that the alert information received from the service server 200 notifies the end of a service, the control information generation part 121 refers to the tier control information 1310 in order to extract an entry in which the type 1313 indicates "DOWN" from the entries corresponding to the file to be processed (Step S1102). To be more specific, the following process will be executed.

The control information generation part 121 refers to the tier control information 1310 in order to search for an entry in which the alert 2101 stores therein the identifier and the address of the file matching the file ID 2212 and the address 2213 included in the alert information notifying the end of service.

The control information generation part 121 extracts an entry in which the type 1313 indicates "DOWN" from the entries retrieved from the search. The control information generation part 121 generates a list based on the entries retrieved from the search and temporarily retains the generated list.

The control information generation part 121 selects an entry to be processed from the entries retrieved from the search (Step S1103). Here, the control information generation part 121 selects entries in an order from the top of the generated list.

The control information generation part 121 generates the cache control information 1300 about the file corresponding to the file ID 1312 of the selected entry (Step S1104). To be more specific, the following process will be executed.

The control information generation part 121 generates a command in order to discharge the cache data of the file corresponding to the file ID 1312 of the selected entry. The control information generation part 121 adds an entry to the cache control information 1300.

The control information generation part 121 sets the information identical to the service ID 1311 of the selected entry to the service ID 1301 of the added entry. Further, the control information generation part 121 sets the identifier of the file identical to the file ID 1312, "delete," and the generated command to the file ID 1302 of the added entry, the type 1303, and the command 1304, respectively.

The above is the description for the process in Step S1104.

The control information generation part 121 makes a determination as to whether or not the process has been completed with respect to all the extracted entries (Step S1105). In a case where it is determined that the process has not been completed with respect to all the extracted entries, the control information generation part 121 returns to Step S1103 in order to executed the process therein.

In a case where it is determined that the process has been completed with respect to all the extracted entries, the control information generation part 121 transmits the cache control information 1300 generated during Step S1104 to the service server 200 (Step S1106). At this point, the control information generation part 121 deletes the cache control information 1300 from the control management information 138.

The control information generation part 121 obtains storage cache information from the storage server 300 (Step S1107). At this point, the control information generation part 121 updates the storage cache management information 133 based on the obtained storage cache information.

The control information generation part 121 refers to the tier control information 1310 in order to extract an entry in which the type 1313 indicates "UP" from the entries of the file to be processed (Step S1108). To be more specific, the control information generation part 121 refers to the tier control information 1310 in order to search for an entry in which the alert 2101 stores therein the identifier and the address of the file matching the file ID 2212 and the address 2213 included in the alert information notifying the end of service. Further, the control information generation part 121 extracts an entry in which the type 1313 indicates "UP" from the entries retrieved from the search. The control information generation part 121 generates a list based on the entries retrieved from the search and temporarily retains the generated list.

The control information generation part 121 selects an entry to be processed from the extracted entries (Step S1109). Here, the control information generation part 121 selects entries in an order from the top of the list.

The control information generation part 121 makes a determination as to whether or not the storage cache 320 is operable to store therein the file to be processed (Step S1110). The process carried out during Step S1110 is the same as the process carried out during Step S505.

In a case where it is determined that the storage cache 320 is operable to store therein the file to be processed, the control information generation part 121 generates the cache control information 1300 about the file corresponding to the file ID 1312 of the selected entry (Step S1111). To be more specific, the following process will be executed.

The control information generation part 121 generates a command in order to store the cache data of the file to be processed in the storage cache 320. The control information generation part 121 adds an entry to the cache control information 1300.

The control information generation part 121 sets the information identical with the service ID 1311 of the selected entry to the service ID 1301 of the added entry. Further, the control information generation part 121 sets the identifier of the file identical to the file ID 1312, "add," and the generated command to the file ID 1302 of the added entry, the type 1303, and the command 1304, respectively.

The above is the description for the process in Step S1111.

The control information generation part 121 makes a determination as to whether or not the process has been completed with respect to all the extracted entries (Step S1112). In a case where it is determined that the process has not been completed with respect to all the extracted entries, the control information generation part 121 returns to Step S1109 in order to executed the process therein.

In a case where it is determined that the process has been completed with respect to all the extracted entries, the control information generation part 121 transmits the cache control information 1300 and the tier control information 1310 related to the file to be processed to the service server 200 (Step S1113), and ends the process. To be more specific, the following process will be executed.

The control information generation part 121 refers to the tier control information 1310 in order to extract an entry in which the alert 2101 stores therein the identifier and the address of the file matching the file ID 2212 and the address 2213 included in the alert information notifying the end of service.

The control information generation part 121 transmits the cache control information 1300 generated during Step S1111 and the control information including the extracted entry to the storage server 300.

According to the second embodiment, the management server 100 is operable to optimize the arrangement of service data in accordance with the service execution schedule of services including job nets, or the like, in a manner cooperative with the cache driver 213 of the service server 200. By virtue of such system, it becomes possible to improve the processing capability of the application 220 running on the service server 200.

Further, since the cache optimization part 110 controls the storage cache 320 in a manner parallel with the data arrangement, the processing capability of the applications 220 will be further improved in a case of changing tiers for the data storage. Furthermore, since the cache optimization part 110 changes the storage location of files in an automatic and dynamic manner based on control policies, the management cost of the computer system will be reduced.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit.

The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A computer system comprising a plurality of servers and a management server,
    wherein the plurality of servers include a plurality of service servers each having an application executing a predetermined service, and a storage server storing data used by the respective applications,
    wherein each of the plurality of service servers comprises a first processor, a first memory coupled to the first processor, a first cache device, coupled to the first processor, including a server cache for temporarily storing data, and a first interface, coupled to the first processor, for coupling to another apparatus,
    wherein the storage server comprises a second processor, a second memory coupled to the second processor, a second cache device, coupled to the second processor, including a storage cache for temporarily storing data, a second interface, coupled to the second processor, for coupling to another apparatus, and a plurality of storage apparatuses each having a different an access performance,
    wherein the management server comprises a third process, a third memory coupled to the third processor, and a third interface, coupled to the third processor, for coupling to another apparatus,
    wherein each of the plurality of service servers comprises a first operating system for controlling a service server, which includes a cache driver for controlling the server cache,
    wherein the storage server comprises a second operating system for controlling the storage server,
    wherein the second operating system generates, via the plurality of storage apparatuses, a plurality of tiered storage areas each having a different access performance, and manages the plurality of tiered storage areas according to performance, wherein the management server comprises a cache optimization part for transmitting a control instruction for arrangement of data on the storage server based on alert information transmitted from a respective cache driver, wherein the cache optimization part includes:

an alert setting information generation part for generating alert setting information indicating when the service servers are to transmit alert information that triggers a change of arrangement of data on the storage server in accordance with a state of a service, the alert setting information further including an address of data used by a service that is used to detect an and of the service, and for transmitting the generated alert setting information to each of the plurality of service servers; and a control information generation part for generating at least one of cache control information including a first command for controlling an arrangement of cache data on the storage cache and tier control information including a second command for controlling an arrangement of the data on the plurality of tiered storage areas, and for transmitting control information including at least one of the cache control information and the tier control information to the storage server, wherein the cache driver of each of the plurality of service servers transmits the alert information to the management server based on the alert setting information indicating when to transmit the alert information, and wherein the second operating system executes at least one of a cache control process for controlling the arrangement of the data on the storage cache and a tier control process for controlling the arrangement of the data on the plurality of tiered storage areas based on the control information received from the management server, wherein the second operating system provides a portion of a storage area of at least one tiered storage area as a storage volume for storing data used by the application, wherein the management server stores:

service management information for managing a correlation among the service server on which the application runs, a service the application executes, an execution schedule of the service, and data used by the service, data management information for managing a correlation between the data and the storage volume storing the data, storage configuration management information for managing a correlation between the storage volume storing the data and the tiered storage area providing a storage area to the storage volume, and tier management information for managing a tired structure of the plurality of tiered storage areas, wherein the control information generation part is configured to:

refer to the service management information to identify a job net including the plurality of services;

select a target service from the plurality of services included in the job net;

refer to the service management information to identify first data used by the target service;

refer to the storage configuration management information to identify a first tiered storage area providing a storage area to store the identified first data;

refer to the tier management information and the storage configuration management information to search for a second tiered storage area having a capability lower than the first tiered storage area and having a storage area for storing the identified first data;

determine an address of the identified first data that will be used to detect an end of the target service;

generate first tier control information including the second command for moving the identified first data from the first tiered storage area to the second tiered storage area and including the determined address of the identified first data;

determine whether or not a related service exists to be executed after the target service;

identify, in a case where it is determined the related service exists, second data used by the related service;

refer to the storage configuration management information to identify a third tiered storage area providing a storage area to store the identified second data;

refer to the tier management information and the storage configuration management information to search for a fourth tiered storage area having a capability higher than the third tiered storage area and having a storage area for storing therein the identified second data;

generate fourth tier control information including the second command for moving the identified second data from the third tiered storage area to the fourth tiered storage area and including the determined address of the identified second data;

transmit, in a case of receiving alert information notifying an end of an arbitrary service from an arbitrary service server, the first tier control information corresponding to the arbitrary service to the arbitrary service server;

refer to the service management information to identify the related service which is executed after the arbitrary service and identify the service server which executes the related service; and transmit the second tier control information corresponding to the related service to the service server which executes the related service.

2. The computer system according to claim 1, wherein the alert setting information generation part is configured to generate the alert setting information including a timer for notifying a cache hit ratio of the server cache, wherein the cache driver of the each of the plurality of service servers is configured to transmit the alert information including the cache hit ratio of the server cache to the management server based on the timer included in the alert setting information, and wherein the control information generation part is configured to:

obtain storage cache information including a free capacity of the storage cache from the storage server in a case of receiving the alert information from an arbitrary service server;

determine whether or not the cache hit ratio of the server cache included in the arbitrary service server is smaller than a first threshold;

refer to the service management information to identify third data used by a service executed on the arbitrary service server in a case where it is determined the cache hit ratio of the server cache included in the arbitrary service server is smaller than the first threshold;

refer to the storage configuration management information to identify a fifth tiered storage area providing a storage area to store the identified first data;

determine whether or not the identified third data is able to store in the storage cache based on the obtained storage cache information, generate first cache control information including the first command for storing the identified first data in the storage cache in a case where it is determined the identified first data is able to store in the storage cache;
refer to the tier management information and the storage configuration management information to search for a sixth tiered storage area having a capability higher than the fifth tiered storage area and having a storage area for storing the identified third data in a case where it is determined the identified third data is not able to store in the storage cache;
generate third tier control information including the second command for moving the identified third data from the fifth tiered storage area to the sixth tiered storage area; and
transmit the control information including at least one of the first cache control information and the third tier control information to the arbitrary service server.

3. The computer system according to claim 2,
wherein the control information generation part is configured to:
obtain the storage cache information from the storage server in a case of receiving the alert information from an arbitrary service server;
determine whether or not the cache hit ratio of the server cache included in the arbitrary service server is greater than a second threshold;
refer to the service management information to identify fourth data used by the service executed on the arbitrary service server in a case where it is determined the cache hit ratio of the server cache included in the arbitrary service server is greater than the second threshold;
refer to the storage configuration management information to identify a seventh tiered storage area providing a storage area to store the identified fourth data;
generate second cache control information including the first command for discharging cache data of the identified fourth data from the storage cache;
refer to the tier management information and the storage configuration management information to search for a eighth tiered storage area having a capability lower than the seventh tiered storage area and having a storage area for storing the identified fourth data;
generate fourth tier control information including the second command for moving the identified fourth data from the seventh tiered storage area to the eighth tiered storage area; and
transmit the control information including the second cache control information and the second tier control information to the arbitrary service server.

4. The computer system according to claim 1,
wherein the control information generation part is configured to:
obtain storage cache information including a free capacity of the storage cache from the storage server in a case of transmitting the first tier control information;
determine, based on the storage cache information, whether or not the data controlled based on the first tier control information is able to store in the storage cache;
generate third cache control information including the first command for storing the data in the storage cache in a case where it is determined the data controlled based on the first tier control information is able to store in the storage cache; and
transmit the third cache control information, instead of the first tier control information, to the arbitrary service server.

5. The computer system according to claim 1,
wherein the control information generation part is configured to:
generate fourth cache control information including the first command for discharging cache data of the data controlled based on the second tier control information from the storage cache in a case of transmitting the second tier control information; and
transmit the fourth cache control information and the second tier control information to the service server which executes the related service.

6. The computer system according to claim 1,
wherein the control information generation part is configured to:
refer to the service management information to determine whether or not the target service is a first service which is executed first in the job net;
refer to the service management information to search for a ninth tiered storage area having a capability higher than the first tiered storage area and having a storage area for storing the identified first data in a case where it is determined the target service is the first service;
generate fifth tier control information including the second command for moving the identified first data from the first tiered storage area to the ninth tiered storage area; and
transmit, in a case of receiving from the service server which executes the first service the alert information notifying a start of the service, the fifth tier control information corresponding to the first service to the service server, and
wherein the alert setting information generation part is configured to:
refer to the service management information to determine a timer for detecting a start of the first service;
determine an address of the identified first data that is used to detect an end of the first service; and
transmit alert setting information including the timer and the determined address of the identified first data to the service server which executes the first service.

7. A data control method for a computer system including a plurality of servers and a management server,
wherein the plurality of servers include a plurality of service servers each having an application executing a predetermined service, and a storage server storing data used by the respective applications,
wherein each of the plurality of service servers includes a first processor, a first memory coupled to the first processor, a first cache device, coupled to the first processor, including a server cache for temporarily storing data, and a first interface, coupled to the first processor, for coupling to another apparatus,
wherein the storage server includes a second processor, a second memory coupled to the second processor, a second cache device, coupled to the second processor, including a storage cache for temporarily storing data, a second interface, coupled to the second processor, for coupling to another apparatus, and a plurality of storage apparatuses each having a different access performance,
wherein the management server includes a third processor, a third memory coupled to the third processor, and a third interface, coupled to the third processor, for coupling to another apparatus, wherein each of the plurality of service servers comprises a first operating system for controlling a service server, which includes a cache driver for controlling the server cache, wherein the storage server comprises a second operating system for controlling the storage server, wherein the second operating system generates, via the plurality of storage apparatuses, a plurality of tiered storage areas each having a different access performance, and manages the plurality of tiered storage areas according to performance, wherein the management server includes a cache optimization part for transmitting a control instruction for arrangement of data on the storage server based on alert information transmitted from the cache driver, wherein the cache optimization part includes:

an alert setting information generation part for generating alert setting information indicating when the service servers are to transmit alert information that triggers a change of an arrangement of data on the storage server in accordance with a state of a service; and a control information generation part for generating at least one of cache control information including a first command for controlling an arrangement of cache data on the storage cache and tier control information including a second command for controlling an arrangement of the data on the plurality of tiered storage areas, wherein the data control method includes:

a first step of transmitting, by the alert setting information generation part, the generated alert setting information to the each of the plurality of service servers;

a second step of transmitting, by the cache driver of each service server, the alert information to the management server based on the alert setting information indicating when to transmit the alert information;

a third step of transmitting, by the control information generation part, control information including at least one of the cache control information and the tier control information in a case of receiving the alert information; and a fourth step of executing, by the second operating system, based on the control information received from the management server at least one of a cache control process for controlling the arrangement of the data on the storage cache and a tier control process for controlling the arrangement of the data on the plurality of the tiered storage areas, wherein the second operating system provides a portion of a storage area of at least one tiered storage area as a storage volume for storing therein data used by the application, wherein the management server stores:

service management information for managing a correlation among the service server on which the application runs, the service the application executes, an execution schedule of the service, and data used by the service, data management information for managing a correlation between the data and the storage volume storing therein the data, storage configuration management information for managing a correlation between the storage volume storing therein the data and the tiered storage area providing a storage area to the storage volume, and tier management information for managing a tired structure of the plurality of tiered storage areas, wherein the data control method includes:

a fifth step of identifying, by the control information generation part, a job net including the plurality of services by referring to the service management information before executing the first step;

a sixth step of selecting, by the control information generation part, a target service out of the plurality of services included in the job net;

a seventh step of identifying, by the control information generation part, first data used by the target service by referring to the service management information;

an eighth step of identifying, by the control information generation part, a first tiered storage area providing a storage area to store the identified first data by referring to the storage configuration management information;

a ninth step of searching, by the control information generation part, for a second tiered storage area having a capability lower than the first tiered storage area and having a storage area for storing the identified first data by referring to the tier management information and the storage configuration management information;

a tenth step of determining, by the control information generation part, an address of the identified first data that will be used to detect an end of the target service;

an eleventh step of generating, by the control information generation part, first tier control information including the second command for moving the identified first data from the first tiered storage area to the fifth tiered storage area and including the determined address of the identified first data;

a twelfth step of determining, by the control information generation part, whether or not a related service exists to be executed after the target service;

a thirteenth step of identifying, by the control information generation part, in a case where it is determined the related service exists, second data used by the related service;

a fourteenth step of identifying, by the control information generation part, a third tiered storage area providing a storage area to store the identified second data by referring to the storage configuration management information;

a fifteenth step of searching, by the control information generation part, for an fourth tiered storage area having a capability higher than the third tiered storage area and having a storage area for storing the identified second data by referring to the tier management information and the storage configuration management information; and a sixteenth step of generating, by the control information generation part, second tier control information including the second command for moving the identified second data from the third tiered storage area to the fourth tiered storage area and including the determined address of the identified first data;

wherein the first step includes a step of generating alert setting information including an address of data used by the target service, that is used to detect an end of the target service, and wherein the third step includes:

a seventeenth step of transmitting, in a case of receiving alert information notifying an end of an arbitrary service from an arbitrary service server, the first tier control information corresponding to the arbitrary service to the arbitrary service server;

an eighteenth step of identifying the related service which is executed after the arbitrary service and identifying the service server which executes the related service by referring to the service management information; and a nineteenth step of transmitting the second tier control information corresponding to the related service to the service server which executes the related service.

8. The data control method according to claim 7, wherein the first step includes a step of generating the alert setting information including a timer for notifying a cache hit ratio of the server cache;

wherein the third step includes:

a step of obtaining storage cache information including a free capacity of the storage cache from the storage server in a case of receiving the alert information including the cache hit ratio of the server cache from an arbitrary service server;

a step of determining whether or not the cache hit ratio of the server cache included in the arbitrary service server is smaller than a first threshold;

a step of identifying third data used by the service executed by the arbitrary service server by referring to the service management information in a case where it is determined the cache hit ratio of the server cache included in the arbitrary service server is smaller than a first threshold;

a step of identifying a fifth tiered storage area providing a storage area storing the identified third data by referring to the storage configuration management information;

a step of determining whether or not the identified third data is able to store in the storage cache based on the obtained storage cache information;

a step of generating first cache control information including the first command for storing the identified third data in the storage cache in a case where it is determined the identified third data is able to store in the storage cache;

a step of searching for a sixth tiered storage area having a capability higher than the fifth tiered storage area and having a storage area for storing the identified third data by referring to the tier management information and the storage configuration management information in a case where it is determined the identified third data is not able to store in the storage cache;

a step of generating third tier control information including the second command for moving the identified third data from the third tiered storage area to the sixth tiered storage area; and a step of transmitting the control information including at least one of the first cache control information and the third tier control information to the arbitrary service server.

9. The control method according to claim 8:

wherein the third step includes:

a step of obtaining the storage cache information from the storage server in a case of receiving the alert information from an arbitrary service server;

a step of determining whether or not a cache hit ratio of the server cache included in the arbitrary service server is greater than a second threshold;

a step of identifying fourth data used by the service executed by the arbitrary service server by referring to the service management information in a case where it is determined the cache hit ratio of the server cache included in the arbitrary service server is greater than the second threshold;

a step of identifying a seventh tiered storage area providing a storage area to store the identified fourth data by referring to the storage configuration management information;

a step of generating second cache control information including the first command for discharging cache data of the identified fourth data from the storage cache;

a step of searching for a eighth tiered storage area having a capability lower than the seventh tiered storage area and having a storage area for storing therein the identified fourth data by referring to the tier management information and the storage configuration management information;

a step of generating second tier control information including the second command for moving the identified fourth data from the seventh tiered storage area to the eighth tiered storage area; and a step of transmitting the control information including the second cache control information and the second tier control information to the arbitrary service server.

10. The control method according to claim 7, wherein the seventeenth step includes:

a step of obtaining storage cache information including a free capacity of the storage cache from the storage server;

a step of determining, based on the storage cache information, whether or not the data controlled based on the first tier control information is able to store in the storage cache;

a step of generating third cache control information including the first command for storing the data in the storage cache in a case where it is determined the data controlled based on the first tier control information is able to store in the storage cache; and a step of transmitting the third cache control information, instead of the first tier control information, to the arbitrary service server.

11. The data control method according to claim 7, wherein the nineteenth step includes:

a step of generating second cache control information including the first command for discharging cache data of the data controlled based on the second tier control information from the storage cache; and a step of transmitting the fourth cache control information and the second tier control information to the service server which executes the related service.

12. The data control method according to claim 7, wherein the sixth step includes:

a step of determining whether or not the target service is a first service which is executed first in the job net by referring to the service management information;

a step of searching for search for a ninth tiered storage area having a capability higher than the first tiered storage area and having a storage area for storing the identified first data by referring to the service management information in a case where it is determined the target service is the first service;

a step of generating fifth tier control information including the second command for moving the identified first data from the first tiered storage area to the ninth tiered storage area; and a step of transmitting, in a case of receiving from the service server which executes the first service alert information notifying a start of the service, the fifth tier control information corresponding to the first service to the service server, and wherein the second step includes:

a step of determining a timer for detecting a start of the first service by referring to the service management information;

a step of determining an address of the identified first data that is used to detect an end of the first service; and a step of transmitting alert setting information including the timer and the determined address of the identified first data to the service server which executes the target service.

* * * * *